(12) United States Patent
Ono et al.

(10) Patent No.: US 7,778,222 B2
(45) Date of Patent: Aug. 17, 2010

(54) WIRELESS IP TELEPHONE SYSTEM

(75) Inventors: Go Ono, Kokubunji (JP); Kazuma Yumoto, Fuchu (JP); Hiroshi Kodaka, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 849 days.

(21) Appl. No.: 11/441,115

(22) Filed: May 26, 2006

(65) Prior Publication Data

US 2006/0271664 A1  Nov. 30, 2006

(30) Foreign Application Priority Data

May 30, 2005  (JP) ............................. 2005-156581

(51) Int. Cl.
*H04W 4/00* (2009.01)
*H04W 36/00* (2009.01)

(52) U.S. Cl. ...................................... 370/331; 455/436
(58) Field of Classification Search ................. 370/331; 455/436
See application file for complete search history.

(56) References Cited

U.S. PATENT DOCUMENTS

| | | | | |
|---|---|---|---|---|
| 6,961,322 B2* | 11/2005 | Viola et al. | ................. | 370/328 |
| 7,020,120 B2* | 3/2006 | Inoue et al. | ................. | 370/338 |
| 7,051,089 B1* | 5/2006 | Johnson et al. | ............. | 709/220 |
| 7,120,136 B2* | 10/2006 | Upp et al. | .................... | 370/331 |
| 7,421,499 B1* | 9/2008 | Lanahan et al. | ............. | 709/226 |
| 2004/0203752 A1 | 10/2004 | Wojaczynski et al. | | |

FOREIGN PATENT DOCUMENTS

WO   01/11904 A1   2/2001

OTHER PUBLICATIONS

RFC3261 "Session Initial Protocol" Jun. 2002.p. 1-236.
RFC2131 "Dynamic Host Configuration Protocol" Mar. 1997.

* cited by examiner

*Primary Examiner*—Marivelisse Santiago-Cordero
(74) *Attorney, Agent, or Firm*—Mattingly & Malur, P.C.

(57) ABSTRACT

A wireless IP telephone system including a dynamic address lease server for leasing an IP address to each of terminals and a controller. The controller has information about the IP address, a SIP URI of the terminal, a type thereof, and a function thereof. The information of the controller is dynamically set by a system administrator who manually sets the information or by the dynamic address lease server and the controller which are cooperated. The controller decides an effective period of the address to be leased to each terminal, informs the dynamic address lease server of the fact, and requires the address lease server to release the address which became unnecessary.

7 Claims, 15 Drawing Sheets

FIG.4A
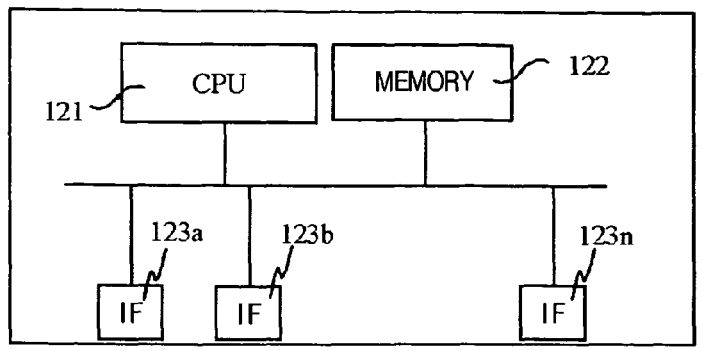
FIG.4B
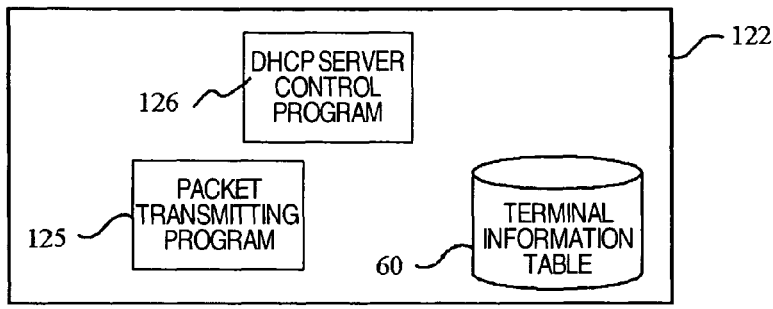
FIG.4C
| MAC ADDRESS | IP ADDRESS | SIP URI | DHCP SERVER | NEW DHCP SERVER | FLAG |
|---|---|---|---|---|---|
| : | : | : | : | : | : |
| mac1 | ip1 | userA@abc.com | dhcp1 | dhcp2 | F, P |
| : | : | : | : | : | : |
FIG.4D
| MAC ADDRESS | IP ADDRESS | SIP URI | DHCP SERVER | NEW DHCP SERVER | FLAG | NEW IP ADDRESS |
|---|---|---|---|---|---|---|
| : | : | : | : | : | : | |

FIG.5A
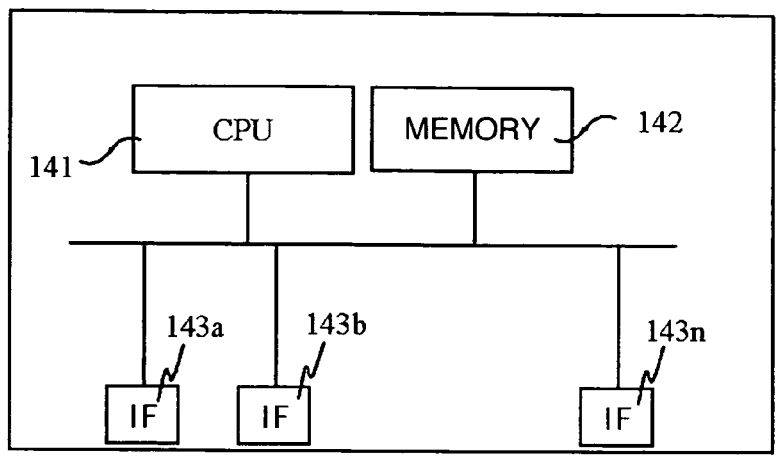
FIG.5B
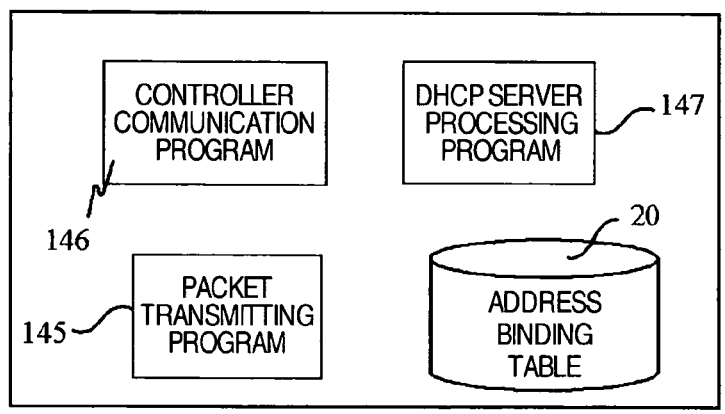
FIG.5C
| MAC ADDRESS | IP ADDRESS | LEASE PERIOD |
|---|---|---|
| ⋮ | ⋮ | ⋮ |
| mac1 | ip1 | 259200 |
| ⋮ | ⋮ | ⋮ |

FIG.11A

| MAC ADDRESS | IP ADDRESS | SIP URI | DHCP SERVER | NEW DHCP SERVER | FLAG |
|---|---|---|---|---|---|
| *mac1* | — | userA@abc.com | — | — | P |
| *mac1* | — | userA@abc.com | — | *dhcp1* | P |
| *mac1* | *ip1* | userA@abc.com | *dhcp1* | — | P |
| *mac1* | *ip1* | userA@abc.com | *dhcp1* | *dhcp2* | P |
| *mac1* | *ip2* | userA@abc.com | *dhcp2* | — | P |

FIG.11B

| MAC ADDRESS | IP ADDRESS | SIP URI | DHCP SERVER | NEW DHCP SERVER | FLAG |
|---|---|---|---|---|---|
| *mac1* | *ip1* | — | — | *dhcp1* | — |
| *mac1* | *ip1* | userA@abc.com | *dhcp1* | — | P |

FIG.11C

| MAC ADDRESS | IP ADDRESS | SIP URI | DHCP SERVER | NEW DHCP SERVER | FLAG |
|---|---|---|---|---|---|
| *mac2* | — | userB@abc.com | — | — | P, F |

FIG.11D

| MAC ADDRESS | IP ADDRESS | SIP URI | DHCP SERVER | NEW DHCP SERVER | FLAG |
|---|---|---|---|---|---|
| *mac1* | *ip3* | userA@abc.com | *dhcp2* | — | P |
| *mac1* | *ip4* | userA@abc.com | — | — | P |

| MAC ADDRESS | IP ADDRESS | HoA | DHCP SERVER | NEW DHCP SERVER | FLAG |
|---|---|---|---|---|---|
| ⋮ | ⋮ | ⋮ | ⋮ | ⋮ | ⋮ |
| mac1 | ip1 | HoA1 | dhcp1 | dhcp2 | P |
| ⋮ | ⋮ | ⋮ | ⋮ | ⋮ | ⋮ |

60 — 71 72 73 74 75 76

| MAC ADDRESS | IP ADDRESS | HoA | DHCP SERVER | NEW DHCP SERVER | FLAG |
|---|---|---|---|---|---|
| mac1 | — | hoa1 | — | — | P |
| mac1 | ip6 | hoa1 | dhcp1 | — | P |
| mac1 | ip6 | hoa1 | dhcp1 | dhcp2 | P |
| mac1 | ip7 | hoa1 | dhcp2 | — | P |

731, 732, 733, 734

TERMINAL INFORMATION MESSAGE

IP HEADER:
- SOURCE IP ADDRESS — 241
- DESTINATION IP ADDRESS — 242
- HoA — 243
- CoA — 244
- FLAG — 245

WIRELESS IP TELEPHONE SYSTEM

INCORPORATION BY REFERENCE

The present application claims priority from Japanese application JP 2005-156581 filed on May 30, 2005, the content of which is hereby incorporated by reference into this application.

BACKGROUND OF THE INVENTION

The present invention relates to wired and wireless IP telephone systems in a network having a dynamic address lease system.

From the purpose of cost reduction or application linkage, companies which shift a telephone system based on a conventional circuit switching network to an IP (Internet Protocol) telephone system operating on an IP network, are increasing in number. In the IP telephone system, a call control server is installed in a LAN (Local Area Network) formed in a company so that a user talks over using an IP telephone terminal. As a call control protocol between the call control server and the IP telephone terminal, SIP (Session Initiation Protocol) already standardized as RFC3261 "Session Initiation Protocol", 2002, June (Literature 1) is well known. And most IP telephone systems in the future will be based on SIP as a mainstream. In this connection, the call control server based on SIP and the IP telephone terminal will be referred to merely as "the SIP server" and "the SIP terminal", hereinafter.

Such a wireless IP telephone that a user can move with an IP telephone terminal carried by the user or can talk over while walking, receives much attention in these years, and a service to form an extension telephone system based on the wireless IP telephone in a company is provided by various communication service providers. In the extension telephone system using the wireless IP telephone, a wireless LAN is formed in the company and a user talks over using a wireless IP telephone terminal. Under the wireless IP telephone system, the user can send and receive a call anywhere so long as the user is in an available wireless LAN environment. Even when the user is in any subnet (which is a small network corresponding to one of divisions of the large network by network prefixes, terminals belonging to the same subnet having the same network prefix), the user can talk over. There also exists such a system that handoff can be realized, that is, a user can move from the current subnet to another subject while keeping his telephone talk.

How to realize a wireless IP telephone system based on SIP will be schematically explained. Since the SIP terminal is an IP terminal, an IP address is set manually or by such a dynamic technique as DHCP (Dynamic Host Configuration Protocol) (refer to RFC2131 "Dynamic Host Configuration Protocol", 1997, March (Literature 2)). In a system using DHCP, a wireless IP telephone terminal has a DHCP client function. In other words, the wireless IP telephone terminal temporarily receives an IP address from the DHCP server installed in the LAN, and uses it, which action is also referred to "the DHCP server leasing the address to the DHCP client". In the Literature 1, the SIP terminal (regardless of wired or wireless type) transmits a message called 'REGISTER' to a SIP registrar (which is a server for processing the REGISTER message from the SIP terminal). The REGISTER message contains a header called contact header, and the SIP terminal by utilizing the header informs the SIP registrar of the current IP address or FQDN (Fully Qualified Domain Name). The SIP registrar, when receiving the REGISTER message, informs a location server (which manages a database relating to positional information of the SIP terminal) of a correlation between the SIP URI (Uniform Resource Identifier) of the terminal as its sender and the IP address. And the location server in turn records the correlation between the SIP URI and the IP address. The correlation between the SIP URI and the IP address will be referred to as the SIP URI/IP address correspondence table, hereinafter. A series of operations from the transmission of the REGISTER message from the SIP terminal to the completion of registration to the location server will be called position registration, hereinafter.

Assume now that a SIP terminal (referred to as the communication party terminal, hereinafter) as the communication party made a call over the wireless IP telephone terminal after the position registration is completed. Calling in SIP is carried out by transmitting a message called 'INVITE'. The INVITE message transmitted from the communication party terminal arrives at the SIP server managing the wireless IP telephone terminal. The SIP server transmits the INVITE message to the wireless IP telephone terminal by inquiring of the location server about the current IP address of the wireless IP telephone terminal. Accordingly, the INVITE message transmitted by the communication party terminal reaches the wireless IP telephone terminal, enabling the start of a speech. In place of transmitting the INVITE message from the SIP server, the SIP server may inform the communication party terminal of the current IP address of the wireless IP telephone terminal, the communication party terminal may retransmit the INVITE message to the current IP address. So far, the SIP registrar, the SIP server, and the location server have been explained to be located in different racks. However, all of these servers may be located in the same rack. These servers are assumed in the following explanation to be located in the same rack, and these servers will be collectively called the SIP server, hereinafter.

Explanation will be further made as to the operation when the wireless IP telephone terminal is shifted from the current subnet to a different subnet. These subnets will hereinafter be referred to as old and new subnets respectively. The wireless IP telephone terminal moves to the new subnet to establish a physical connection. This means, for example, to establish a connection with a access point in the new subnet, which is called establishment of an association. Thereafter, the wireless IP telephone terminal, using a dynamic address lease system such as DHCP, acquires an IP address to be used in the subnet, and transmits a REGISTER message to the SIP server as mentioned above to thereby perform position registration based on the new IP address. When a speech is being made between the communication party terminal and the wireless IP telephone terminal during movement between the subnets, the wireless IP telephone terminal transmits an INVITE message to the communication party terminal to inform the communication party terminal of the new IP address. Accordingly, the speech can be uninterruptedly continued even after the movement between the subnets.

There is also known such a service that the wireless IP telephone terminal utilizes the REGISTER message to be transmitted each time the terminal moves to another subnet to provide the position of the wireless IP telephone terminal as presence information. In this service, the SIP server or the presence server previously recognizes a correlation between the network prefix and physical position information (about company's conference room, living room, etc.), and thus can identify the position of the wireless IP telephone by collating it with the IP address of the wireless IP telephone terminal informed by the REGISTER message.

SUMMARY OF THE INVENTION

Problems in the wireless IP telephone system so far mentioned above will be explained by referring to FIG. 1. FIG. 1 shows a network configuration of a wireless IP telephone system in a company. A LAN includes a base network 10 and a plurality of subnets (hereinafter, shortened to subnets) 11a, 11b, and 11c. It is assumed in this example that the base network 10 is connected with the subnet 11a via a router 3a; whereas, the base network 10 is connected with the subnets 11b and 11c via a router 3b. The subnets 11a, 11b, and 11c provide wireless LAN connections as access points (which is abbreviated to APs in the drawing) 5a, 5b, and 5c. A SIP server 1 and DHCP servers 2a and 2b are installed in the base network. The DHCP server 2a plays a role in address lease to the subnet 11a, while the DHCP server 2b plays a role in address lease to the subnets 11b and 11c. Further, a public wireless LAN service based on an external access point 7 is provided outside the company. A subnet configured in the public LAN service will be referred to as an external subnet 12, and a DHCP server in the subnet will be referred to as an external DHCP server 6.

In the network configuration of FIG. 1, it is assumed that a wireless IP telephone terminal (which is abbreviated to MS in the drawing) 4 is present in the subnet 11a and an address ip1 is leased from the DHCP server 2a. The DHCP server usually has such an address binding table 20 showing a relationship between the IP address it is leasing to the DHCP client and the terminal as shown in FIG. 5C. The address correspondence table includes, at least, fields (1) to (3) which follow. That is, (1) "MAC address field" (shown by reference numeral 21 in FIG. 5C) for identification of a DHCP client terminal, (2) "IP address field" (shown by reference numeral 22 in FIG. 5C) showing an address leased to the DHCP client, and (3) "lease period field" (shown by reference numeral 23 in FIG. 5C) showing the effective lease period (seconds in unit) of the address. In the example of FIG. 5C, the entries of the wireless IP telephone terminal 4 are registered or recorded. That is, the MAC address field 21, the IP address field 22, and the lease period field 23 are set to have mac1, ip1, and 259200 respectively.

Assuming that the wireless IP telephone terminal 4 is moved from the aforementioned subnet 11b, then the wireless IP telephone terminal 4 cuts off a connection with the access point 5a and establishes a connection with the access point 5b. The wireless IP telephone terminal 4 also receives an IP address leased from the DHCP server 2b to be used in the subnet 11b. This IP address is assumed to be ip2. Accordingly, at this time point, the address ip1 so far leased from the DHCP server 2a in the subnet 11a becomes unnecessary. However, the address ip1 still remains in the address binding table 20 as the entry of the address ip1 leased to the wireless IP telephone terminal 4, and the address ip1 is regarded as being leased to the wireless IP telephone terminal 4. For this reason, this IP address can be again used only after passage of the lease period (259200 seconds=3 days) specified in the lease period field 23. This is a waste of IP address resource. For example, when all IP addresses the DHCP server 2a possesses are put in the lease periods due to other aforementioned phenomenon, other wireless IP telephone terminals cannot move to the subnet 11a.

In order to weaken troubles involved by the above problem, when each DHCP server leases an IP address to a DHCP client, its lease period can be set to be short. However, if the wireless IP telephone terminal stays in the subnet for a time longer than the lease period, then the lease period must be prolonged, which results in that a radio band is limited and this becomes a load of the DHCP server. When there exists a fixed IP telephone terminal permanently stayed in the subnet, further, the lease period of the fixed IP telephone terminal is required to be prolonged each time the lease period is expired. Thus this requires packet switching with DHCP server, with the result that the traffic of the network and the load of the DHCP server are increased.

One of objects of the present invention is to prevent address depletion as when an IP addresses is wastefully leased continuously to a wireless IP telephone terminal in a dynamic IP address lease system and the IP address is treated as being still leased and cannot be reused in spite of the fact that the wireless IP telephone terminal is already moved from the corresponding subnet to another subnet.

Another one of problems of the present invention is to reduce the load of a dynamic IP address lease server and the quantity of signals flowing through a network, involved by a wireless IP telephone terminal which prolongs the lease period of an IP address.

Upon realizing the above objects, it is not required to add a special function to an ordinary wireless IP telephone terminal.

A controller having a table (which will be referred to as the terminal information table, hereinafter) for managing information on terminals (fixed IP telephone terminals and wireless IP telephone terminals (mobile terminals)) is provided. Information on each terminal includes a MAC address, an IP address, SIP URI, and a flag indicative of the type or function of the terminal. The flag indicative of the terminal type or function is, for example, (1) a flag indicative of whether the terminal is a fixed IP terminal or a wireless IP terminal, or (2) a flag indicative of whether the terminal, whenever the terminal is moved to another subnet, has a function of informing a call control server of the fact. The terminal information table possessed by the controller may be manually set by an administrator of a wireless IP telephone system or may have a means for dynamically configuring the table.

The dynamic IP address lease server, when receiving a request of lease of an IP address from each terminal, inquires of the controller about the lease period of the IP address to be leased to the terminal. The controller, when receiving this inquiry, decides a lease period optimum for the terminal by referring to the terminal information table, and notifies the dynamic address lease server of it. The dynamic address lease server leases the address to the terminal according to the notification. The decision of the lease period is set, for example, according to a rule which follows. (1) When the terminal is a fixed IP telephone terminal, a long lease period is set. (2) When the terminal is a wireless IP telephone terminal and when the terminal has a function of informing the call control server of the fact of each movement of the terminal to another subnet, a long lease period is set. (3) Otherwise or when information on the terminal is unknown, a short lease period is set. As a result, since a sufficient lease period necessary for communication can be allocated to the fixed IP telephone terminal or to the wireless IP telephone terminal having the notification function, a frequency of prolongation of the lease period can be reduced and the load of the dynamic address lease server can be reduced. Meanwhile, when the wireless IP telephone terminal having the notification function was moved to another subnet, the call control server receives a notification of acquisition of a new IP address from the wireless IP telephone terminal. Thus, in response to it, when the call control server demands release of the address leased in the subnet before the movement of the wireless IP telephone terminal from the dynamic address lease server, the IP address is put in a releasable state and thus the IP address resource can be effectively used.

Such a phenomenon that an IP address leased to a wireless IP telephone terminal according to the dynamic address lease system in a subnet is still put in a leased state in spite of the fact that the wireless IP telephone terminal is already moved from the subnet to another subnet can be prevented, and the effective use of the IP address can be realized.

Thus an increase in the quantity of signals and an increase in the load of the dynamic address lease server, involved by the terminal which performs the prolonging operation on the lease period of the IP address in the dynamic address lease system, can be avoided.

The above effect can be realized without adding a unique function of the present invention to the terminal.

Other objects, features and advantages of the invention will become apparent from the following description of the embodiments of the invention taken in conjunction with the accompanying drawings.

BRIEF DESCRIPTION OF THE DRAWINGS

FIG. 4A is a block diagram of a controller in the present invention;

FIG. 4B shows contents of a memory 122 in the controller;

FIG. 4C is a terminal information table in the memory 122;

FIG. 4D is another terminal information table in the memory 122;

FIG. 5A is a block diagram of a DHCP server in the present invention;

FIG. 5B shows contents of a memory 142 in the DHCP server;

FIG. 5C is an address correspondence table in the memory 142;

FIGS. 11A, 11B, 11C, 11D show various entries of the terminal information table;

DETAILED DESCRIPTION OF THE EMBODIMENTS

Figure 1:
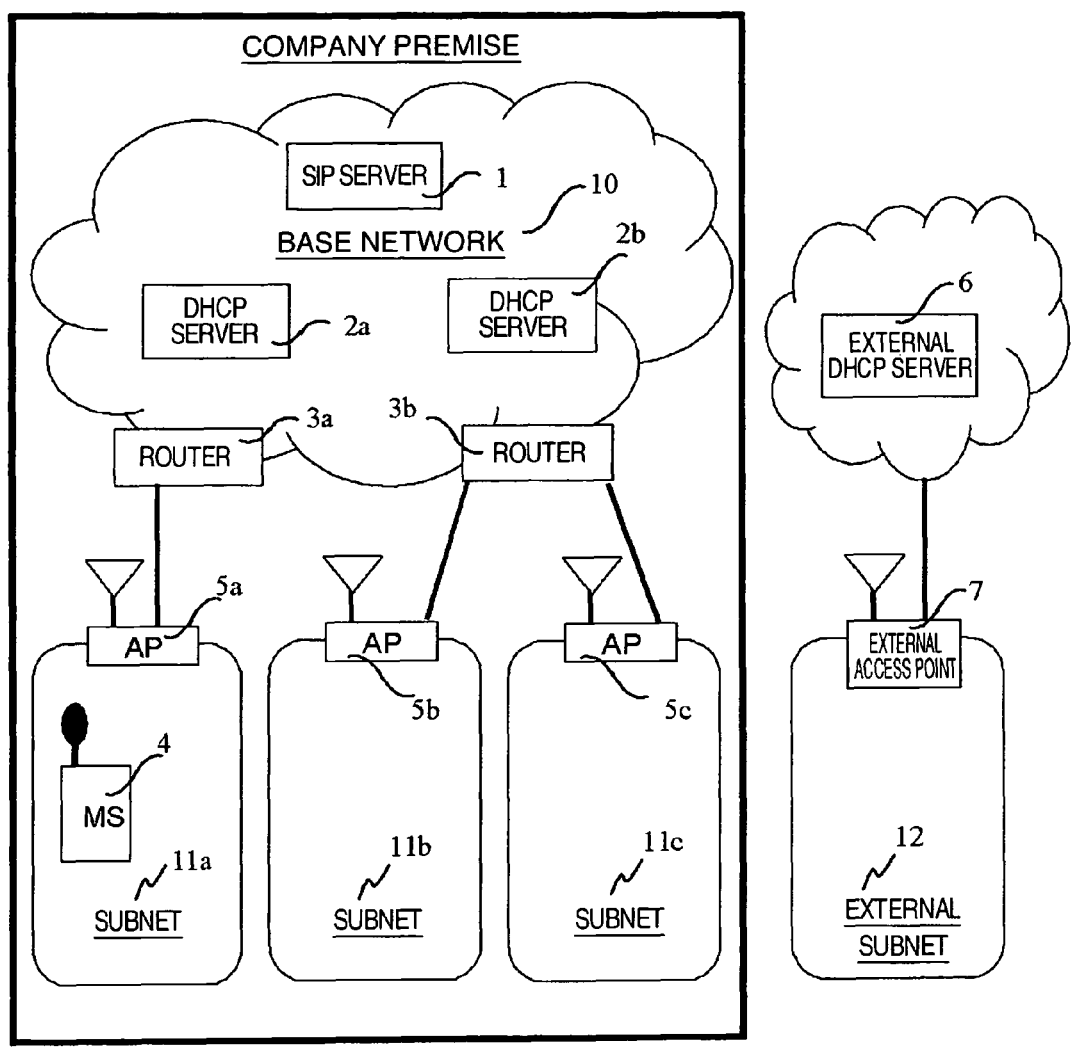
FIG. 1 is a network configuration of a prior art wireless IP telephone system.
Figure 2:
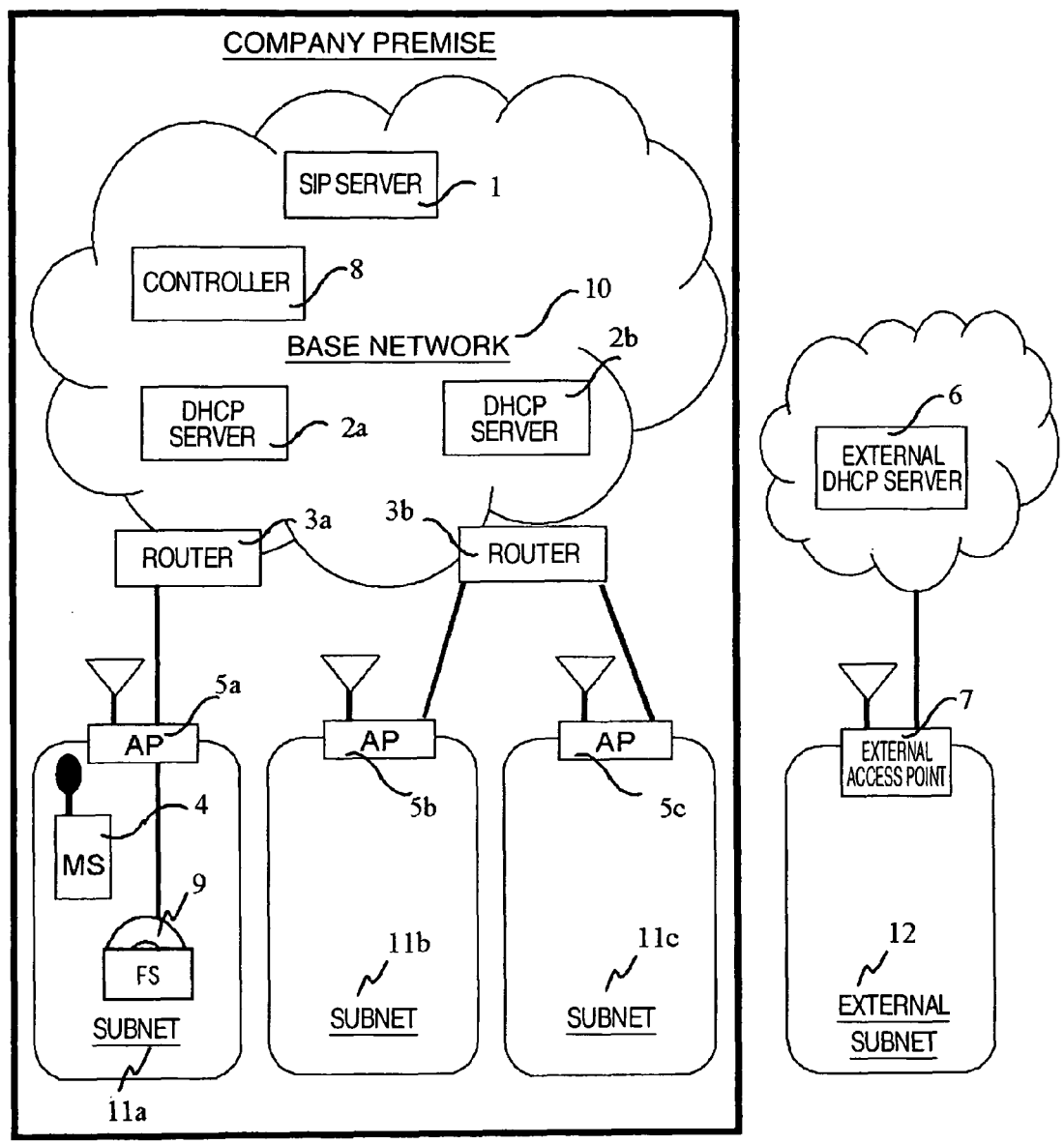
FIG. 2 is a network configuration of a wireless IP telephone system to which the present invention is applied.

Embodiments of the present invention will be explained with reference to the attached drawings. In the following description, a network configuration shown in FIG. 2 is used. FIG. 2 corresponds to a network configuration of FIG. 1 but is different therefrom in that a fixed IP telephone terminal 9 is newly added in a subnet 11a. The fixed IP telephone terminal 9 is assumed to be connected to the subnet 11a by a wire line such as an Ethernet cable ('Ethernet' is a trademark registered by a XEROX company). A SIP server 1 and DHCP servers 2a, 2b in FIG. 2 have a unique function expanding means of the present invention which will be described later. A controller 8 as a unique system of the present invention is also provided. In FIG. 2, the SIP server 1 and the controller 8 are illustrated as different racks. However, the controller 8 is a logical system and thus may be provided in the same rack as the SIP server 1. Similarly, the controller 8 may be provided in the same rack as each DHCP server. It is assumed in the following description that the controller 8 is provided in a rack different from both the SIP server and the DHCP servers.

Embodiment 1

Explanation will be made as to how to decide the address lease period of a wireless IP telephone terminal when an administrator for a network previously manually sets terminal information as an embodiment 1. The operations of a SIP server, a DHCP server, and a controller in the present invention will first be explained.

Figure 3A:
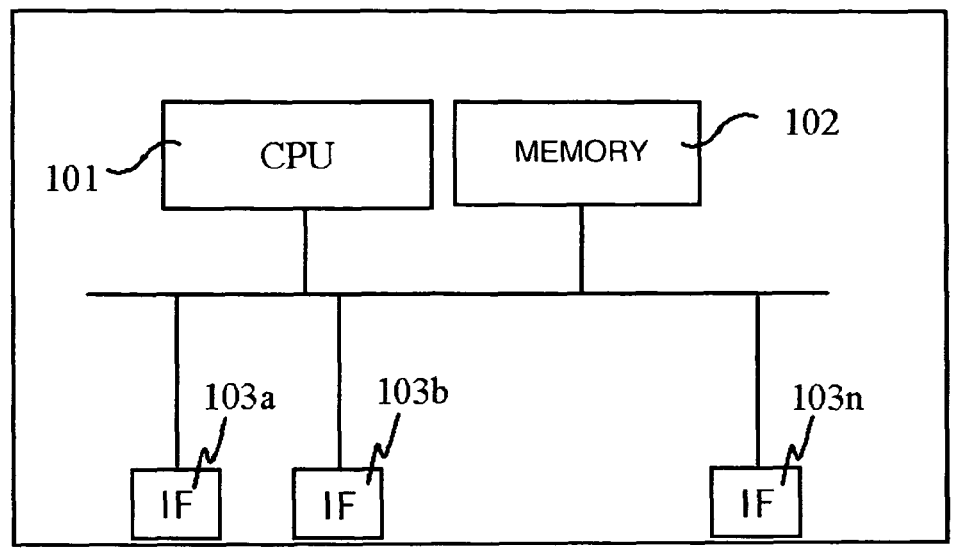
FIG. 3A is a block diagram of an SIP server in the present invention.
Figure 3B:
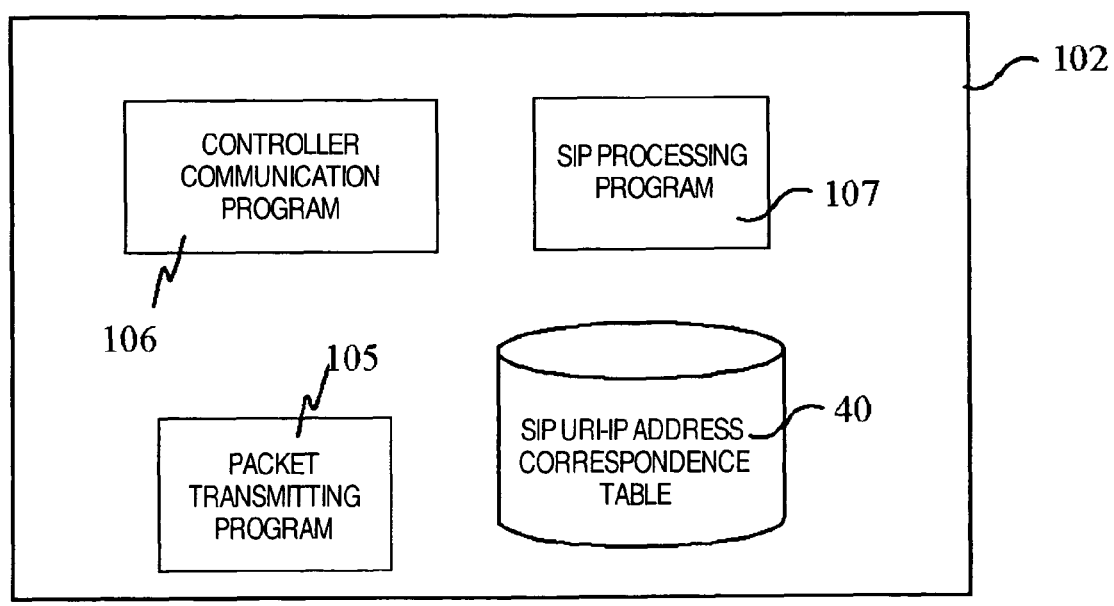
FIG. 3B shows contents of a memory 102 in the SIP server.

FIG. 3A shows a SIP server in the present invention. The SIP server has a CPU 101, a memory 102, network interfaces (abbreviated to IFs in the drawing) 103a to 103n. A packet transmitting program 105, a program 106 for communication with the controller (referred to as the controller communication program 106), a SIP processing program 107, and a SIP URI-IP address correspondence table 40 are stored in a memory 102 (refer to FIG. 3B), and these programs and the table are controlled by the CPU 101. The packet transmitting program 105 stored in the memory is the same as a conventional packet transmitting program. The SIP processing program 107 is also the same as that in a conventional SIP server (conforming to the RFC3261 specifications), and the SIP URI-IP address correspondence table 40 to be used by the SIP processing program 107 is also the same as a conventional SIP URI-IP address correspondence table. However, the controller communication program 106 is a function newly required in the present invention, and is used, when the SIP server received a REGISTER message from a SIP client, to inform the controller of the message reception. Since this program informs the controller of the fact that the REGISTER message was transmitted from the terminal, the controller can detect a movement in the terminal and release the address so far used before the movement at the timing of the movement.

Figure 6A:
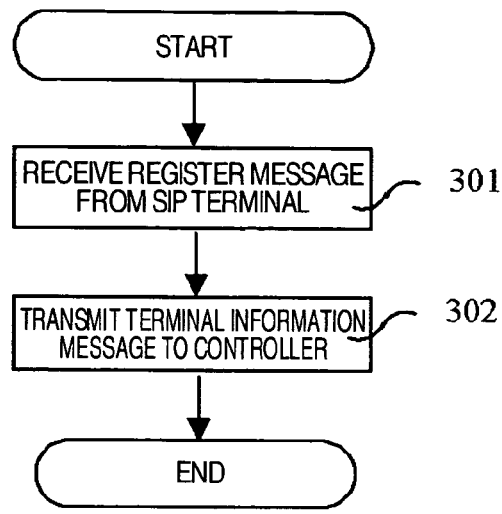
FIG. 6A is a flow chart of SIP operation in the present invention.
Figure 9A:
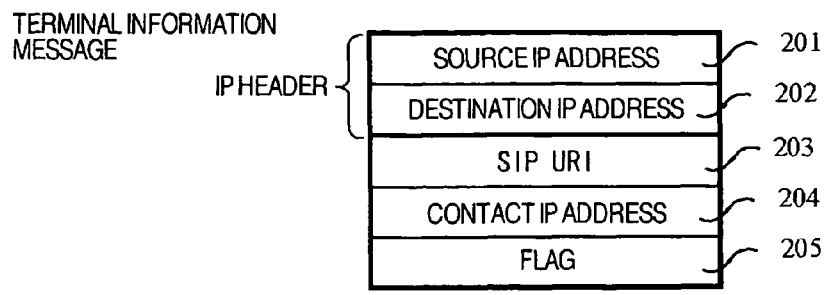
FIGS. 9A, 9B, 9C, 9D show different formats of a packet newly added in the present invention respectively.

FIG. 6A shows a flow chart showing the operation of the controller communication program 106. The controller communication program 106 monitors the REGISTER message to be received by the SIP processing program 107. When the SIP processing program 107 received the REGISTER message (a step 301 in FIG. 6A), the controller communication program 106 transmits a terminal information message to the controller (a step 302 in FIG. 6A). The terminal information message is used to inform the controller of the current state of the terminal, and a packet format of the message is shown in FIG. 9A. A source IP address 201 (FIG. 9A) in an IP header of the terminal information message is the IP address of the SIP server, and a destination IP address 202 (FIG. 9A) in the IP header is the IP address of the controller. A data part of the terminal information message includes fields for storing therein a SIP URI 203 (FIG. 9A) of the terminal, a current contact IP address 204 (FIG. 9A), and a flag 205 (FIG. 9A) respectively. In the present invention, the flag has two states P and F, that is, "P flag" indicates that the terminal has a capability of informing the current IP address in the form of the REGISTER message or the like; whereas, "F flag" indicates that the terminal is a fixed IP telephone terminal. When the terminal is a wireless IP telephone terminal or when the type of the terminal is unknown, these flags are not set. Using these flags, the controller can decide a suitable address lease period for each terminal.

Explanation will be made as to the controller in the present invention. FIG. 4A shows a controller. The controller has a CPU 121, a memory 122, and network interfaces 123a to 123n. A DHCP server control program 126, a packet transmitting program 125, and a terminal information table 60 are stored in the memory 122 (refer to FIG. 4B). These programs and the table are controlled by the CPU 121. The packet transmitting program 125 stored in the memory is the same as a conventional packet transmitting program. The terminal information table 60 contains information for use when the controller decides a lease period suitable for each terminal. Since the lease period is decided according to the terminal information table 60, wasteful address lease or wasteful prolongation of the address lease period can be avoided.

Figure 9B:
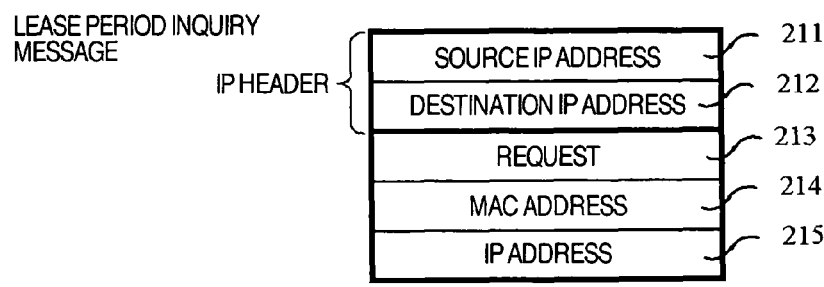
Figure 9C:
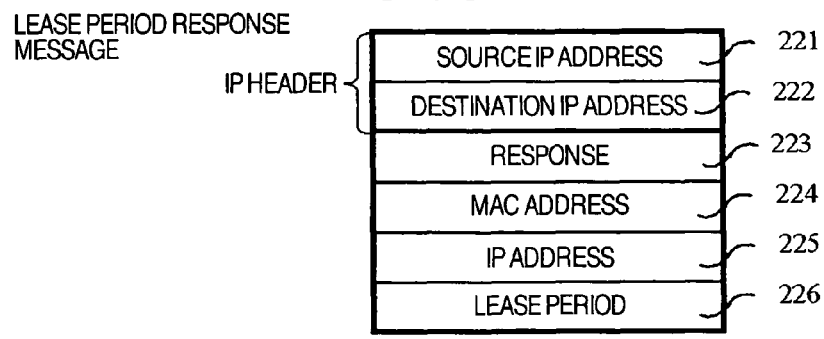

FIG. 4C shows a structure of the terminal information table 60 having fields of a MAC address 61 (FIG. 4C), an IP address 62 (FIG. 4C), and a SIP URI 63 (FIG. 4C) respectively. The terminal information table 60 further has a DHCP server field 64 (FIG. 4C), a new DHCP server field 65 (FIG. 4C), and a flag field 66 (FIG. 4C). Such P and F flags as mentioned above are recorded in this flag field 66. The DHCP server control program 126 plays roles of receiving the terminal information message (FIG. 9A) from the SIP server and updating the terminal information table 60, and also receiving a lease period response message (FIG. 9B) from the DHCP server, setting a suitable lease period, and transmitting a lease period response message (FIG. 9C). The DHCP server control program, when transmitting a release request message (FIG. 9D) to the DHCP server, also plays a role of requesting the DHCP server to release the address being leased.

Prior to explanation of the operation of the DHCP server control program 126, explanation will first be made as to the format of a packet newly added in the present invention. The lease period inquiry message is a packet, when the DHCP server leases an IP address to a DHCP client, for inquiring of the controller about the lease period of the IP address. An format of the packet is shown in FIG. 9B. A source IP address 211 (FIG. 9B) in an IP header of the lease period inquiry message is the IP address of the DHCP server, and a destination IP address 212 (FIG. 9B) is the IP address of the controller. A data part of the packet includes a request field 213 (FIG. 9B) indicative of being the lease period inquiry message, a MAC address field 214 (FIG. 9B) of the DHCP client, and a field 215 (FIG. 9B) having an IP address to be leased to the DHCP client.

The lease period response message is a packet for use when the controller informs the DHCP server of the lease period, and a format of the packet is shown in FIG. 9C. A source IP address 221 (FIG. 9C) in an IP header of the lease period response message indicates the IP address of the controller as a sender, and a destination IP address 222 (FIG. 9C) indicates the IP address of the DHCP server. A data part of the message includes a response field 223 (FIG. 9C) indicative of being the lease period response message, a MAC address field 224 (FIG. 9C) indicative of the MAC address of the DHCP client, a field 225 (FIG. 9C) having an IP address to be leased to the DHCP client, and a lease period field 226 (FIG. 9C) indicative of a lease period proposed by the controller.

Figure 9D:
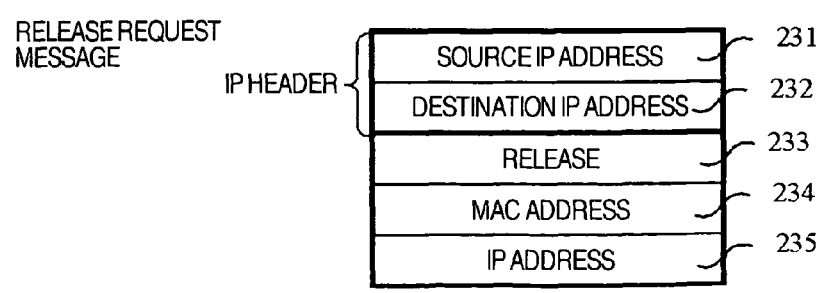

The release request message is a packet for use when the controller requires the DHCP server to release the IP address being leased, and a format of the packet is shown in FIG. 9D. A source IP address 231 (FIG. 9D) in an IP header of the message indicates the IP address of the controller as a sender, and a destination IP address 232 (FIG. 9D) indicates the IP address of the DHCP server. A data part of the message includes a release field 233 (FIG. 9D) indicative of being the release request message, a MAC address field 234 (FIG. 9D) indicative of the MAC address of the DHCP client to be leased, and an IP address field 235 (FIG. 9D) indicative of the IP address being leased to the DHCP client.

Figure 7:
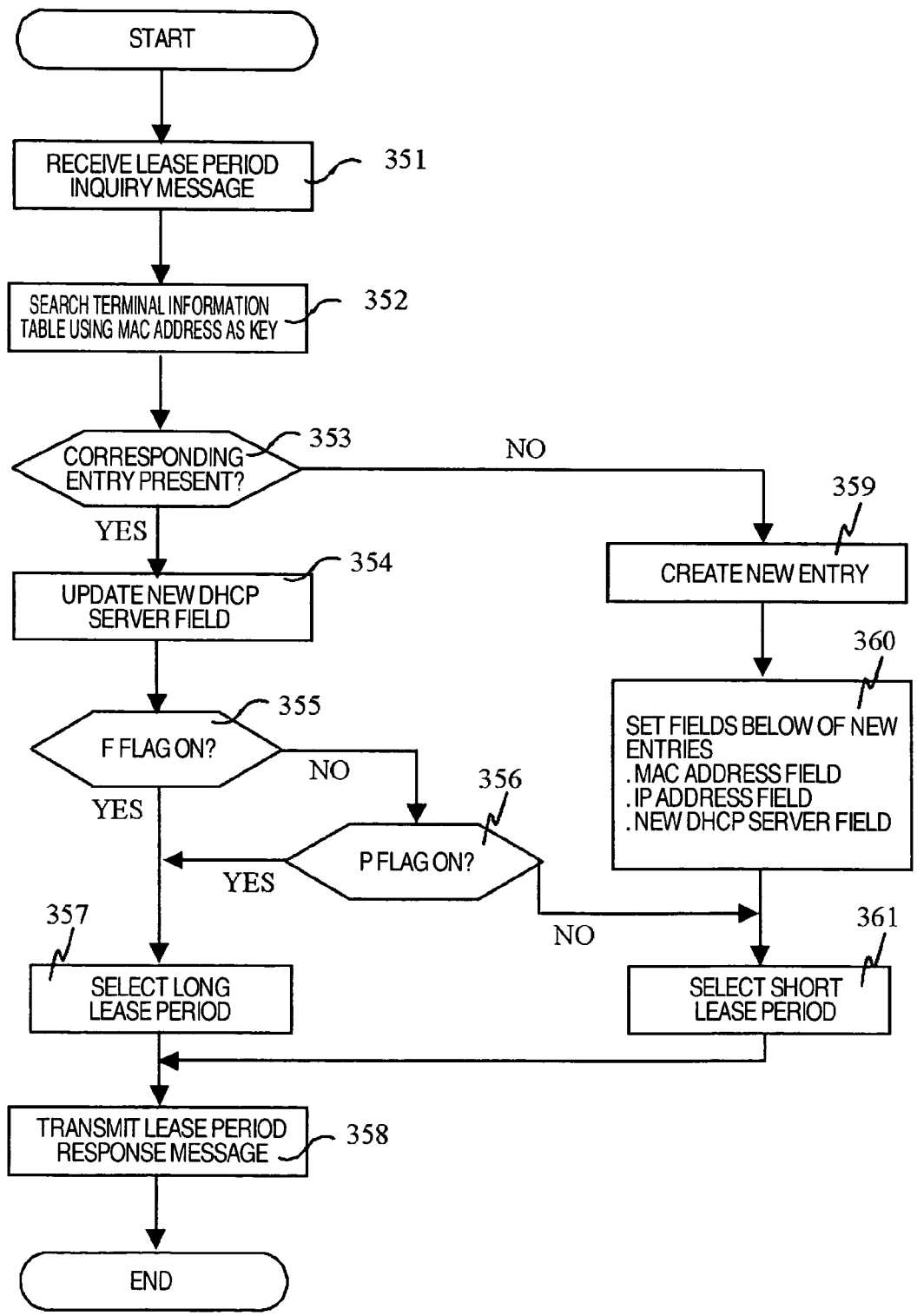
FIG. 7 is a flow chart showing the operation when the controller of the present invention receives an inquiry of a lease period from the DHCP server.

The operation when the DHCP server control program 126 receives the lease period inquiry message (FIG. 9B) from the DHCP server will be explained by referring to a flow chart of FIG. 7. When receiving the lease period inquiry message (a step 351 in FIG. 7), the DHCP server control program first searches the terminal information table 60 (a step 352 in FIG. 7) with use of a value in the MAC address field 214 (FIG. 9B) of the same message as a key, and examines the presence or absence of the corresponding entry (a step 353 in FIG. 7). In the presence of the entry, the DHCP server control program updates the value of the new DHCP server field of the corresponding entry to the source IP address 211 (FIG. 9B) of the lease period inquiry message (a step 354 in FIG. 7). The DHCP server control program further refers to the flag field 66 (FIG. 4C) of the corresponding entry and confirms the P or F flag (steps 355 and 356 in FIG. 7). When the P and F flags are both 'OFF' (not set), the program selects a short lease period (a step 361 in FIG. 7). Otherwise, the program selects a longer lease period (a step 357 in FIG. 7). Through the above operations, the long lease period is allocated to a wireless IP telephone terminal having a function of informing of the REGISTER message or to a fixed IP telephone terminal, and the short lease period is allocated to the other terminals. As a result, wasteful address lease or wasteful prolongation of the address lease period can be prevented. And the program transmits the lease period response message (FIG. 9C) to the DHCP server as the sender of the lease period inquiry message (a step 358 in FIG. 7), terminating its operation. At this time, the lease period selected in the aforementioned manner is stored in the lease period field 226 (FIG. 9C) of the lease period response message. In the absence of an entry as the result of the step 353 of FIG. 7, on the other hand, the program creates a new entry in the terminal information table 60 (a step 359 in FIG. 7). The values of the MAC address field 214 (FIG. 9B), the IP address field 215 (FIG. 9B), and the source IP address 211 (FIG. 9B) in the lease period inquiry message are copied to the MAC address 61 (FIG. 4C), the IP address 62 (FIG. 4C), and the new DHCP server field 65 (FIG. 4C) as a new entry respectively (a step 360 in FIG. 7). Thereafter, the DHCP server control program selects the short lease period (the step 361 in FIG. 7), transmits the lease period response message as in the above case (the step 358 in FIG. 7), thus terminating its operation.

Explanation will next be made as to the operation when the DHCP server control program 126 receives the terminal information message (FIG. 9A) from the SIP server, by referring to a flow chart of FIG. 8. When receiving the terminal information message (a step 381 in FIG. 8), the DHCP server control program first searches the terminal information table 60 with use of the value of the SIP URI field 203 (FIG. 9A) of the same message as a key (a step 382 in FIG. 8), and examines the presence or absence of the corresponding entry (a step 383 in FIG. 8). In the presence of the entry, the program compares the value of the contact IP address 204 (FIG. 9A) in the terminal information message with the value of the IP address 62 (FIG. 4C) of the corresponding entry to know whether these values are equal or not. When finding an equality therebetween, the program terminates its operation. When finding an inequality therebetween, the program examines whether or not a value is stored in the DHCP server field 64 (FIG. 4C) of the corresponding entry (a step 385 in FIG. 8). In the presence of the stored value, the program transmits the release request message to the DHCP server shown in the DHCP server field (a step 386 in FIG. 8). Through the above operations, an address already not used can be effectively released. In this connection, the values of the MAC address 61 (FIG. 4C) and the IP address 62 (FIG. 4C) in the corresponding entries are copied to the MAC address field 234 (FIG. 9D) and the IP address field 235 (FIG. 9D) in the then release request message. When a result of the step 385 (FIG. 8) is NO, the programs execute no operation in the step 386 in FIG. 8. Thereafter, the value of the IP address 62 (FIG. 4C) of the corresponding entry is updated to the value of the contact IP address 204 (FIG. 9A) of the terminal information message (a step 387 in FIG. 8). Further, the program examines whether or not a value is stored in the new DHCP server field 65 (FIG. 4C) of the corresponding entry (a step 388 in FIG. 8). In the presence of the stored value, the program copies the value to the DHCP server field 64 (FIG. 4C) (a step 389 in FIG. 8). Thereafter, the program clears the new DHCP server field 65 (FIG. 4C) (a step 390 in FIG. 8), terminating its operation. When a result of the step 388 in FIG. 8 is NO, the program clears the value of the DHCP server field 64 (FIG. 4C) (a step 391 in FIG. 8), terminating its operation.

Figure 8:
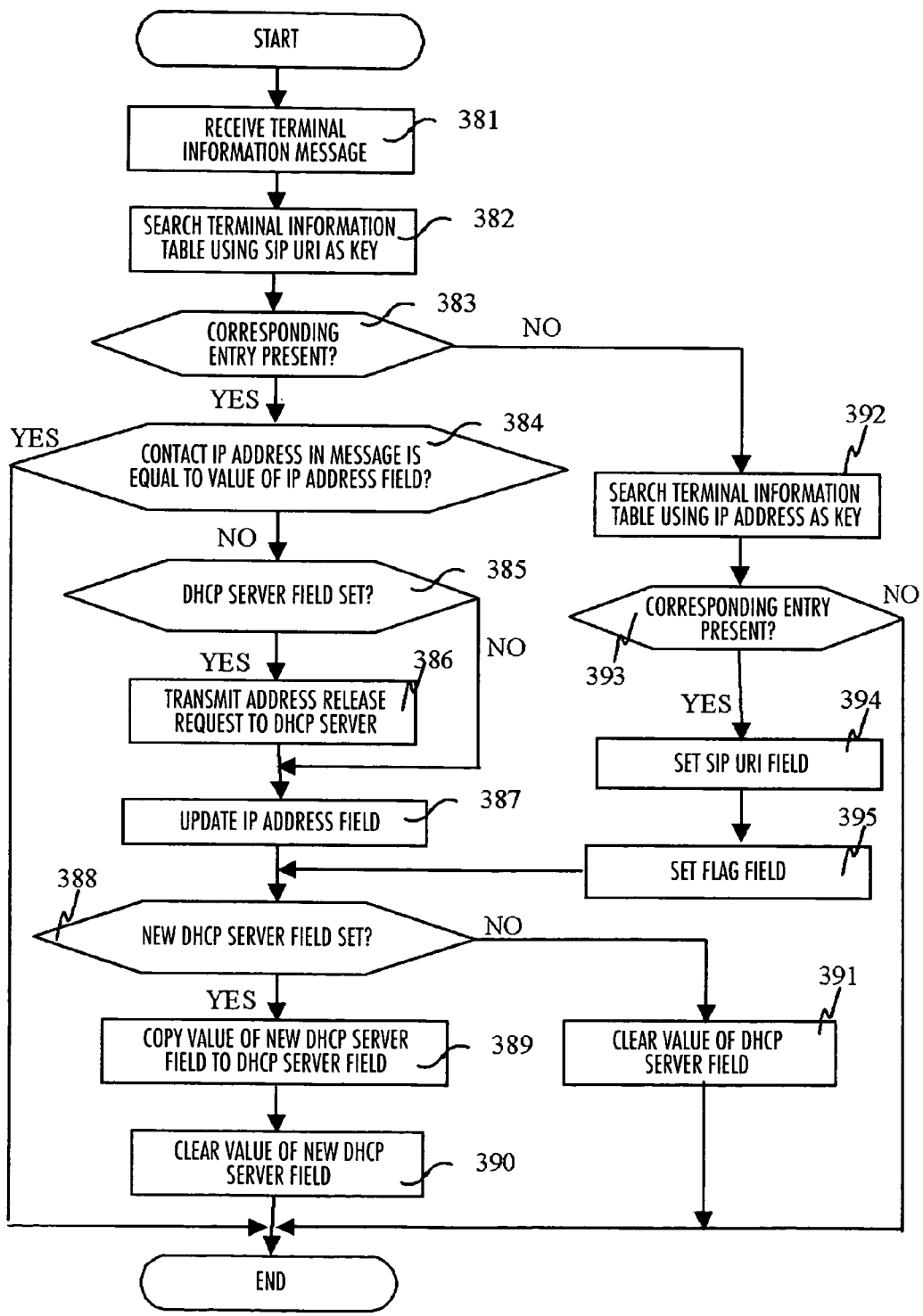
FIG. 8 is a flow chart when the controller of the present invention receives a notification of information about a SIP terminal from the SIP server.

In the absence of an entry as the result of the step 383 of FIG. 8, on the other hand, the program searches the terminal information table 60 with use of the value of the contact IP address 204 (FIG. 9A) of the terminal information message as a key (a step 392 in FIG. 8), and examines the presence or absence of the corresponding entry (a step 393 in FIG. 8). In the absence of the entry, the program terminates its operation. In the presence of the entry, the program copies the values of the SIP URI field 203 (FIG. 9A) and the flag field 205 (FIG. 9A) of the terminal information message to the SIP URI field 63 (FIG. 4C) and the flag field 66 (FIG. 4C) of the corresponding entries respectively (steps 394 and 395 in FIG. 8). Thereafter, the program moves to the step 388 of FIG. 8, and terminates its operation through the aforementioned steps.

FIG. 5A shows a DHCP server in the present invention. The DHCP server has a CPU 141, a memory 142, and network interfaces 143a to 143n. a packet transmitting program 145, a program 146 for communication with the controller (referred to as the controller communication program 146), a DHCP processing program 147, and an address binding table 20 are stored in the memory 142 (FIG. 5B). These programs and the table are controlled by the CPU 141. The packet transmitting program 145 stored in the memory is the same as a conventional packet transmitting program. The DHCP processing program 147 is also the same as a conventional DHCP server except for a method of selecting a lease period and conforms to the RFC2131 specifications. The address binding table 20 to be used by the DHCP processing program 147 is also the same as an ordinary address correspondence table. In the lease period selection method, the selection is carried out on the basis of a value proposed by the controller communication program 146. The controller communication program 146 is a function newly required in the present invention. That is, the controller communication program plays roles of inquiring of the controller about a lease period and releasing the address being leased according to a release request from the controller.

FIG. 5C shows a necessary minimum structure of the address binding table 20, having fields of a MAC address 21 (FIG. 5C), an IP address 22 (FIG. 5C) being leased, and a lease period 23 (FIG. 5C) for each DHCP client.

Figure 6B:
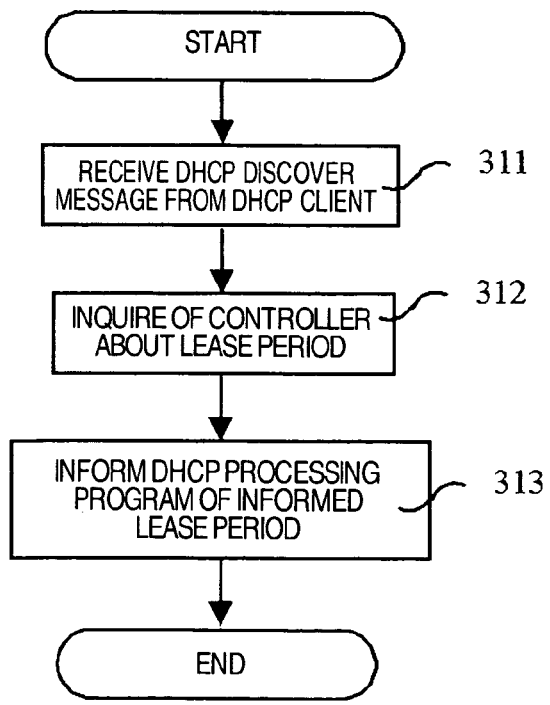
FIG. 6B is a flow chart of DHCP server operation.

Shown in FIG. 6B is a flow chart showing the operation of the controller communication program 146 when receiving a DHCP DISCOVER (a message for searching the DHCP server) from a DHCP client. When receiving the DHCP DISCOVER message (a step 311 in FIG. 6B), the controller communication program inquires of the controller about a lease period suitable for the terminal (a step 312 in FIG. 6B). More specifically, this is carried out by transmitting the lease period inquiry message to the controller. The MAC address of the DHCP client included in the DHCP DISCOVER message is stored in the MAC address field 214 (FIG. 9B) in the same lease period inquiry message. The IP address to be leased is set in the IP address field 215 (FIG. 9B). Thereafter, the controller communication program informs the DHCP processing program 147 of the lease period field 226 (FIG. 9C) included in the lease period response message transmitted from the controller, thus terminating its operation (a step 313 in FIG. 6B).

Figure 6C:
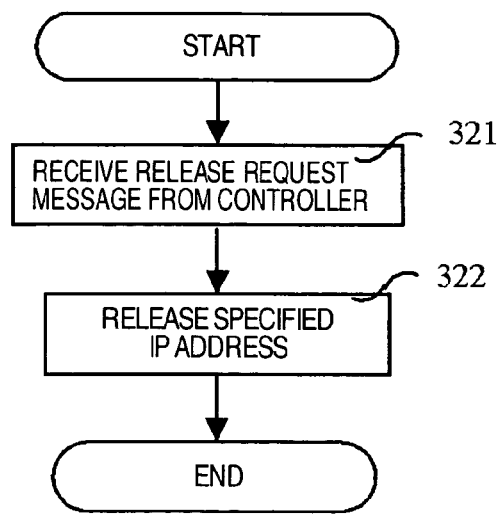
FIG. 6C is another flow chart of the DHCP server operation.

FIG. 6C shows a flow chart of the operation of the controller communication program 146 when receiving a release request message from the controller. When receiving the release request message (a step 321 in FIG. 6C), the controller communication program releases the IP address specified by the release request (a step 322 in FIG. 6C). This operation enables efficient release of the address already not used. This means, for example, to search the address binding table 20 with use of the MAC address field 234 (FIG. 9D) and the IP address field 235 (FIG. 9D) in the release request message as keys and to delete the IP address of the corresponding entry. After the above operations, the controller communication program terminates its operation.

Figure 10:
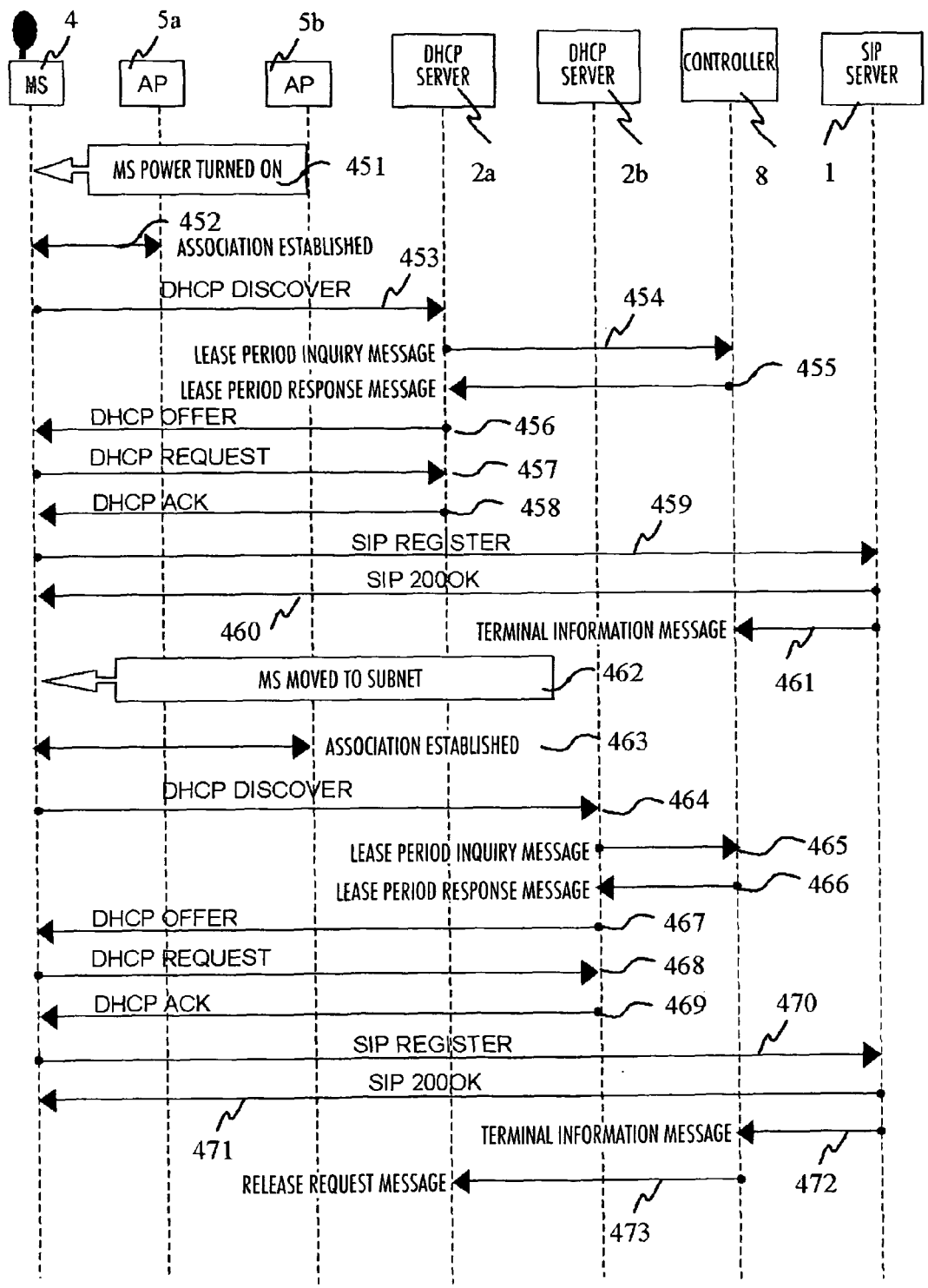
FIG. 10 is a sequence diagram when a wireless IP telephone terminal is moved between subnets.

Having the above explanation in mind, next, a sequence diagram of FIG. 10 shows an example of operations when the wireless IP telephone terminal is activated in the subnet 11a and moved to the subnet 11b in the wireless IP telephone system of FIG. 2. It is assumed in the present embodiment that the entries of the wireless IP telephone terminal 4 are previously recorded in the terminal information table 60 of the controller 8 by the system administrator. These entries are as shown by reference numeral 601 in FIG. 11A, including a MAC address of 'mac1' and a SIP URI of 'userA@abc.com'. Since the terminal is a mobile terminal having a REGISTER transmission function, a P flag is set and an F flag is not set.

It is assumed that the user first turns ON the power of the wireless IP telephone terminal 4 in the subnet 11a (451 in FIG. 10). Immediately after the turning ON of the wireless IP telephone terminal 4, the terminal 4 establishes an association with the access point 5a (452 in FIG. 10), and transmits the DHCP DISCOVER message to the DHCP server 2a (453 in FIG. 10). The DHCP server 2a when receiving the DHCP DISCOVER message transmits a lease period inquiry message to the controller 8 with an address to be leased as ip1 (in the step 312 of FIG. 6B) (454 in FIG. 10). A value of 'mac1' is stored in the MAC address field 214 (FIG. 9B) of this packet, and 'ip1' is stored in the IP address field 215 (FIG. 9B)

thereof. The controller 8, when receiving the lease period inquiry message, stores the address (of, for example, 'dhcp1') of the DHCP server 2a in the new DHCP server field 65 (FIG. 4C) for the entry shown by 601 in FIG. 11A (in the step 354 of FIG. 7). The controller confirms the flag field 66 (FIG. 4C). Since the controller finds a P flag set in the flag field, the controller selects a long lease period (in the step 357 of FIG. 7). Through the above operations, the long lease period can be allocated to the wireless IP telephone terminal 4 capable of detecting a movement and thus wasteful prolongation of the address lease period can be prevented. Thereafter, the controller transmits a lease period response message to the DHCP server 2a (in the step 358 of FIG. 7) (455 in FIG. 10). The long lease period selected in the previous step is stored in the lease period field 226 (FIG. 9C) of the same message. At this time point, entries for the wireless IP telephone terminal 4 in the terminal information table 60 of the controller 8 are as shown by 602 in FIG. 11A.

The DHCP server 2a, when receiving the lease period response message, transmits a DHCP OFFER message to the wireless IP telephone terminal 4 (456 in FIG. 10) and informs the terminal 4 of an IP address to be leased, its lease period and so on. The lease period is the long lease period specified by the controller 8. The wireless IP telephone terminal 4 when receiving the DHCP OFFER message transmits a DHCP REQUEST message to the DHCP server to require the server to lease the address (457 in FIG. 10). In response to it, the DHCP server 2a transmits a DHCP ACK message to the terminal 4 (458 in FIG. 10) to establish the IP address to be leased and its lease period. The wireless IP telephone terminal 4 when receiving the DHCP ACK message transmits a SIP REGISTER message to the SIP server 1 to record the current contact address in the SIP server (459 in FIG. 10). The SIP server 1 in turn, when receiving the SIP REGISTER message, transmits a SIP 200 OK message to the terminal (460 in FIG. 10). At this time, the SIP server 1 transmits a terminal information message to the controller 8 (in the step 302 of FIG. 6A) (461 in FIG. 10). A value 'userA@abc.com' is stored in the SIP URI field 203 (FIG. 9A) of the message, a value 'ip1' is stored in the contact IP address 204 (FIG. 9A) thereof, and a P flag is stored in the flag field 205 (FIG. 9A) thereof.

The controller 8 when receiving the terminal information message sets 'ip1' in the IP address 62 (FIG. 4C) (in the step 387 of FIG. 8), stores 'dhcp1' in the DHCP server field 64 (FIG. 4C) (in the step 389 of FIG. 8), and clears the value of the new DHCP server field 65 (FIG. 4C) (in the step 390 of FIG. 8), with respect to the entries (602 in FIG. 11) of the terminal information table 60. At this time point, entries for the wireless IP telephone terminal 4 in the terminal information table 60 of the controller 8 are as shown by 603 in FIG. 11A.

After this, it is assumed that the user moves and the wireless IP telephone terminal 4 of the user is moved into the subnet 11b (462 in FIG. 10). Immediately after the movement, the wireless IP telephone terminal 4 establishes an association with the access point 5b (463 in FIG. 10) and transmits a DHCP DISCOVER message to the DHCP server 2b (464 in FIG. 10). The DHCP server 2b when receiving the DHCP DISCOVER message transmits a lease period inquiry message to the controller 8 with an address to be leased as 'ip2' (465 in FIG. 10). A value 'mac1' is stored in the MAC address field 214 (FIG. 9B) of this packet, and a value 'ip2' is stored in the IP address field 215 (FIG. 9B) thereof. The controller 8 when receiving the packet stores the address (of, for example, 'dhcp2') of the DHCP server 2b in the new DHCP server field 65 (FIG. 4C), with respect to entries shown by 603 in FIG. 11 (in the step 354 of FIG. 7). Further, since the controller confirms the flag field 66 (FIG. 4C) and finds the P flag set, the controller selects a long lease period (in the step 357 of FIG. 7). Thereafter, the controller transmits a lease period response message to the DHCP server 2b (in the step 358 of FIG. 7) (466 in the step 10). The long lease period selected in the previous step is stored in the lease period field 226 (FIG. 9C) of the same message. At this time point, entries for the wireless IP telephone terminal 4 in the terminal information table 60 of the controller 8 are shown by 604 in FIG. 11A.

The DHCP server 2b when receiving the lease period response message transmits a DHCP OFFER message to the wireless IP telephone terminal 4 (467 in FIG. 10) to inform the terminal of the IP address to be leased, its lease period, etc. The lease period is the long lease period specified by the controller 8. Through the operations of the controller 8 and the DHCP server 2b, an address lease period suitable for each terminal can be set. The wireless IP telephone terminal 4 when receiving the message transmits a DHCP REQUEST message to the DHCP server 2a (468 in FIG. 10). In response to the message, the DHCP server 2a in turn transmits a DHCP ACK message to the terminal 4 (469 in FIG. 10). The wireless IP telephone terminal 4 when receiving the message transmits a SIP REGISTER message to the SIP server 1 (470 in FIG. 10). The SIP server 1 in turn when receiving the message transmits a SIP 200 OK message to the terminal 4 (471 in FIG. 10). At this time, the SIP server 1 further transmits a terminal information message to the controller 8 (472 in FIG. 10). A value 'userA@abc.com' is stored in the SIP URI field 203 (FIG. 9A) of this message, a value 'ip2' is stored in the contact IP address 204 (FIG. 9A), and a P flag is stored in the flag field 205 (FIG. 9A) respectively.

The controller 8, when receiving the terminal information message, transmits a release request message to the DHCP server 2a (that is, with a destination IP address of 'dhcp1') (in the step 386 of FIG. 8) (473 in FIG. 10). A value 'mac1' is stored in the MAC address field 234 (FIG. 9D) of the same message, and a value 'ip1' is stored in the IP address field 235 (FIG. 9D). With respect to the entry 604 of FIG. 11A in the terminal information table 60, the controller further sets a value 'ip2' in the IP address 62 (FIG. 4C) (in the step 387 of FIG. 8), stores a value 'dhcp2' in the DHCP server field 64 (FIG. 4C) (in the step 389 of FIG. 8), and clears the value of the new DHCP server field 65 (FIG. 4C) (in the step 390 of FIG. 8). At this time point, entries for the wireless IP telephone terminal 4 in the terminal information table 60 of the controller 8 are as shown by 605 in FIG. 11A. The DHCP server 2a when receiving the release request message transmitted from the controller 8 can release the IP address 'ip1' to be reused. Through the operations of the controller 8 and the DHCP server 2a, the address already not used can be efficiently released.

Since the long lease period is set for the wireless IP telephone terminal 4 as mentioned above, a frequency of prolongation of the lease period caused by the expiration of the lease period can be reduced, and an increase in the load of the DHCP server or an increase in the quantity of signals, involved by the period prolongation can be avoided. Further, since the IP address, which becomes unnecessary as the wireless IP telephone terminal moves to another subnet, can be released, the wasteful lease state of the IP address can be eliminated and its IP address resource can be effectively used.

Embodiment 2

Explanation will then be made as to how to decide an address lease period for a wireless IP telephone terminal when a system administrator does not previously record information in a controller terminal information table (when the terminal information table has no entries) as an embodiment 2. Since its operational sequence is similar to in the embodiment 1, explanation will be made by using FIG. 10.

It is now assumed that, in the wireless IP telephone system of FIG. 2, the user present in the subnet 11a turns ON the power of the wireless IP telephone terminal 4 (451 in FIG. 10). Immediately after the turning ON, the wireless IP telephone terminal 4 establishes an association with the access point 5a (452 in FIG. 10), and transmits a DHCP DISCOVER message to the DHCP server 2a (453 in FIG. 10). The DHCP server 2a, when receiving the message, sets an address 'ip1' to be leased, and transmits a lease period inquiry message to the controller 8 (in the step 312 of FIG. 6B) (454 in FIG. 10). A value 'mac1' is stored in the MAC address field 214 (FIG. 9B) of the packet, and a value 'ip1' is stored in the IP address field 215 (FIG. 9B). The controller 8, when receiving the lease period inquiry message, newly creates an entry for the wireless IP telephone terminal 4 in the terminal information table 60 (in the step 359 of FIG. 7). The controller further stores a value 'mac1' in the MAC address 61 (FIG. 4C) of the created entry, stores the value 'ip1' in the IP address 62 (FIG. 4C), and stores an address 'dhcp1' for the DHCP server 2a in the new DHCP server field 65 (FIG. 4C) (in the step 360 of FIG. 7). And the controller selects the short lease period as its lease period (in the step 361 of FIG. 7). Thereafter, the controller transmits a lease period response message to the DHCP server 2a (in the step 358 of FIG. 7) (455 in FIG. 10). In this case, the short lease period selected in the previous step is stored in the lease period field 226 (FIG. 9C) of the same message. At this time point, entries for the wireless IP telephone terminal 4 in the terminal information table 60 of the controller 8 are as shown by 611 in FIG. 11B.

The DHCP server 2a, when receiving the lease period response message, transmits a DHCP OFFER message to the wireless IP telephone terminal 4 (456 in FIG. 10), and informs the wireless IP telephone terminal of the IP address to be leased and its lease period. This lease period is the short lease period specified by the controller 8. The wireless IP telephone terminal 4, when receiving the message, transmits a DHCP REQUEST message to the DHCP server 2a (457 in FIG. 10), and in response to it, the DHCP server 2a transmits a DHCP ACK message to the terminal 4 (458 in FIG. 10). The wireless IP telephone terminal 4, when receiving the message, transmits a SIP REGISTER message to the SIP server 1 to record the current contact address in the SIP server (459 in FIG. 10). And the SIP server 1 in turn when receiving the message transmits a SIP 200 OK message to the wireless IP telephone terminal 4 (460 in FIG. 10). At this time, the SIP server 1 transmits a terminal information message to the controller 8 (in the step 302 of FIG. 6A) (461 in FIG. 10). A value 'userA@abc.com' is stored in the SIP URI field 203 (FIG. 9A) of the message, a value 'ip1' is stored in the contact IP address 204 (FIG. 9A), and a P flag is stored in the flag field 205 (FIG. 9A) respectively. With regard to the entry 611 (FIG. 11B) in the terminal information table 60, the controller 8, when receiving the message, stores the value 'userA@abc.com' in the SIP URI field 63 (FIG. 4C) (in the step 394 of FIG. 8), and stores the P flag in the flag field 66 (FIG. 4C) (in the step 395 of FIG. 8). Further, the controller stores a value 'dhcp1' in the DHCP server field 64 (FIG. 4C) (in the step 389 of FIG. 8), and clears the value of the new DHCP server field 65 (FIG. 4C) (in the step 390 of FIG. 8). At this time point, entries for the wireless IP telephone terminal 4 in the terminal information table 60 of the controller 8 are as shown by 612 in FIG. 11B.

When the entries (612 in FIG. 11B) are compared with the entries (603 in FIG. 11A), both entries have exactly the same values. Thus, after this, when the wireless IP telephone terminal 4 is moved to the subnet 11b, the wireless IP telephone terminal 4 can lease the IP address 'ip2' with the long lease period to be used in the subnet 11b. And the IP address 'ip1', which became unnecessary, can be immediately released, in exactly the same manner as in the foregoing embodiment.

According to the present embodiment, the setting of the optimum lease period and the release of the unnecessary IP address can be realized while eliminating the need for the system administrator to previously record entries for the corresponding terminal in the terminal information table. Accordingly, the efficient use of the IP address can be realized while lightening the working load of the system administrator in the present invention.

Embodiment 3

Explanation will be made as to how to decide an address lease period for a fixed IP telephone terminal when a system administrator previously manually sets terminal information as an embodiment 3, by using a sequence diagram of FIG. 12. Explanation will also made as to the operation when the fixed IP telephone terminal performs prolonging operation on a lease period in the present embodiment.

It is assume in the wireless IP telephone system of FIG. 2 that entries for the fixed IP telephone terminal 9 are previously recorded in the terminal information table 60 of the controller 8 by the system administrator. The entries are as shown in 621 in FIG. 11C. That is, the MAC address has a value 'mac2' and the SIP URI has a value 'userB@abc.com'. Since the terminal has a REGISTER transmitting function, both of P and F flags are set in the flag field.

Figure 12:
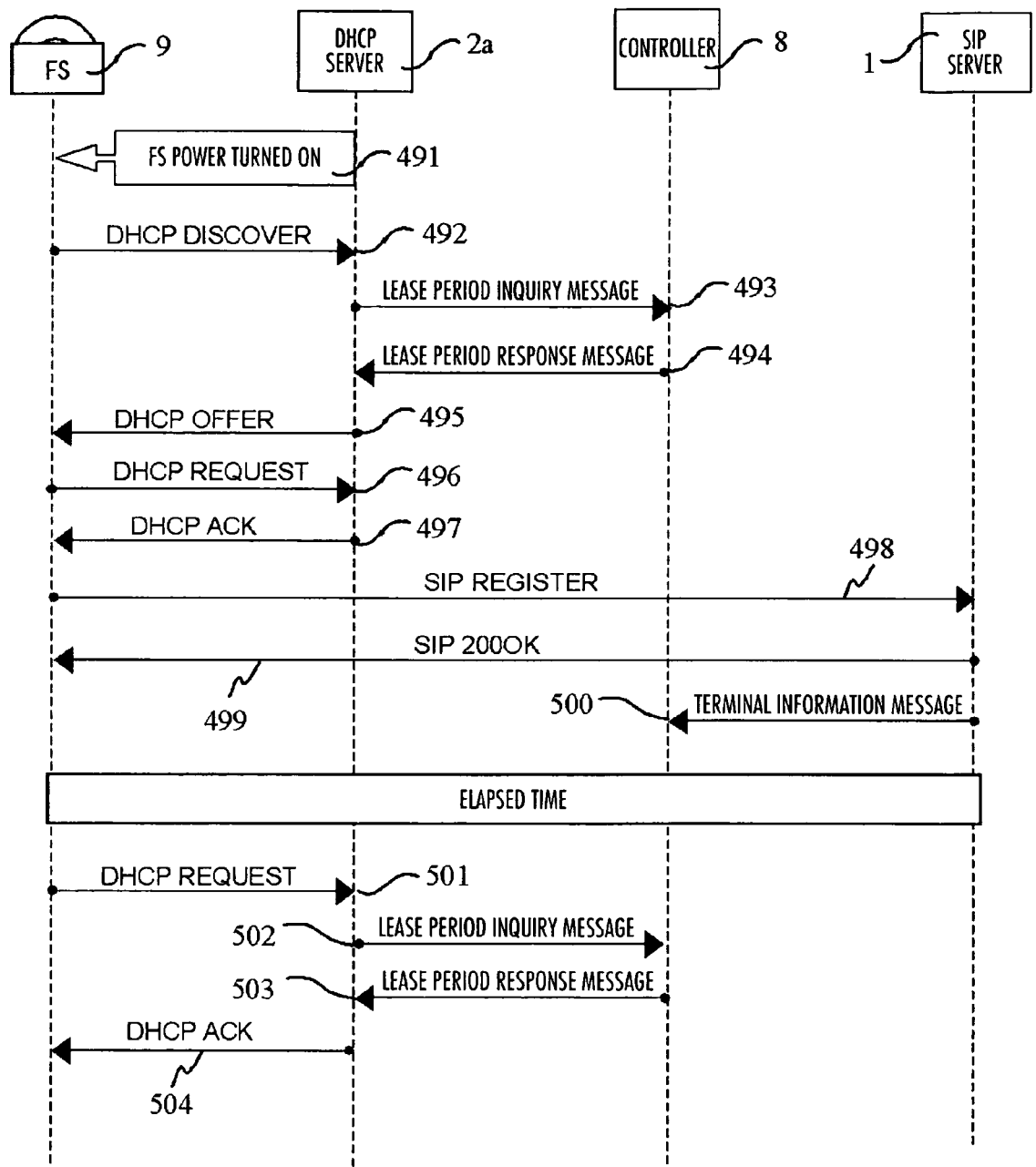
FIG. 12 is a sequence diagram when a fixed IP telephone terminal leases an IP address and then prolongs its lease period.

It is now assumed under this condition that the user turns ON the power of the fixed IP telephone terminal 9 (491 in FIG. 12). After the activation of the fixed IP telephone terminal 9, the terminal transmits a DHCP DISCOVER message to the DHCP server 2a (492 in FIG. 12). The DHCP server 2a, when receiving the message or packet, transmits a lease period inquiry message with an address 'ip5' to be leased to the controller 8 (in the step 312 of FIG. 6B) (493 in FIG. 12). A value 'mac2' is stored in the MAC address field 214 (FIG. 9B) of this packet, and a value 'ip5' is stored in the IP address field 215 (FIG. 9B). The controller 8, when receiving the message, refers to the entries (621 in FIG. 11C) in the terminal information table 60 and confirms that an F flag is set. Thus the controller 8 selects a long lease period as the lease period and transmits a lease period response message to the DHCP server 2a (494 in FIG. 12). The long lease period previously selected in the previous step is stored in the lease period field 226 (FIG. 9C) of the same message. The DHCP server 2a, when receiving the message, continuously performs its DHCP operations (495 to 497 in FIG. 12), and the IP address 'ip5' with the long lease period is leased to the fixed IP telephone terminal 9. Thereafter, in exactly the same procedure as in the embodiment of the wireless IP telephone, REGISTER operation and the transmission of a terminal information message are carried out (498 to 500 in FIG. 12).

It is assumed thereafter that time elapses and it comes a time when the fixed IP telephone terminal 9 performs its prolonging operation on the lease period of the IP address 'ip5' being currently leased. In order to perform the period prolonging operation, the fixed IP telephone terminal 9 transmits a DHCP REQUEST message to the DHCP server 2a (501 in FIG. 12). The DHCP server 2a, when receiving the message, transmits a lease period inquiry message to the controller 8 as in the above case (502 in FIG. 12). The controller 8 in turn sets a long lease period by referring to the entry (621 in FIG. 11C), and transmits a lease period response message to the DHCP server 2a (503 in FIG. 12). The DHCP server 2a, when receiving the message, transmits a DHCP ACK message to the fixed IP telephone terminal 9, with the result that the prolongation of the lease period is completed and the lease period is again changed to the long lease period (504 in FIG. 12).

According to the present embodiment, since the long lease period is set for the fixed IP telephone terminal upon lease of the IP address, increases in the traffic and in the server load involved by the lease period prolongation can be reduced.

Embodiment 4

Explanation will be made as the operation of the present invention when a wireless IP telephone terminal is moved from a subnet present within the company shown in FIG. 2 to an external subnet outside the company as an embodiment 4. More specifically, explanation is made as to the operation when the wireless IP telephone terminal 4 present in the subnet 11c is moved to the external subnet 12, by referring to a sequence diagram of FIG. 13. In this case, the external DHCP server 6, which leases an address to the external subnet, is an ordinary DHCP server (based on the RFC2131 specifications) having no unique function of the present invention added thereto.

It is assumed that the wireless IP telephone terminal 4 first present in the subnet 11c already receives an address leased from the DHCP server 2b and already transmits a SIP REGISTER message to the SIP server 1. Assuming that an IP address leased from the DHCP server 2b has a value of 'ip3', then entries for the wireless IP telephone terminal 4 in the terminal information table 60 of the controller 8 are as shown by 631 in FIG. 11D at this time point.

Figure 13:
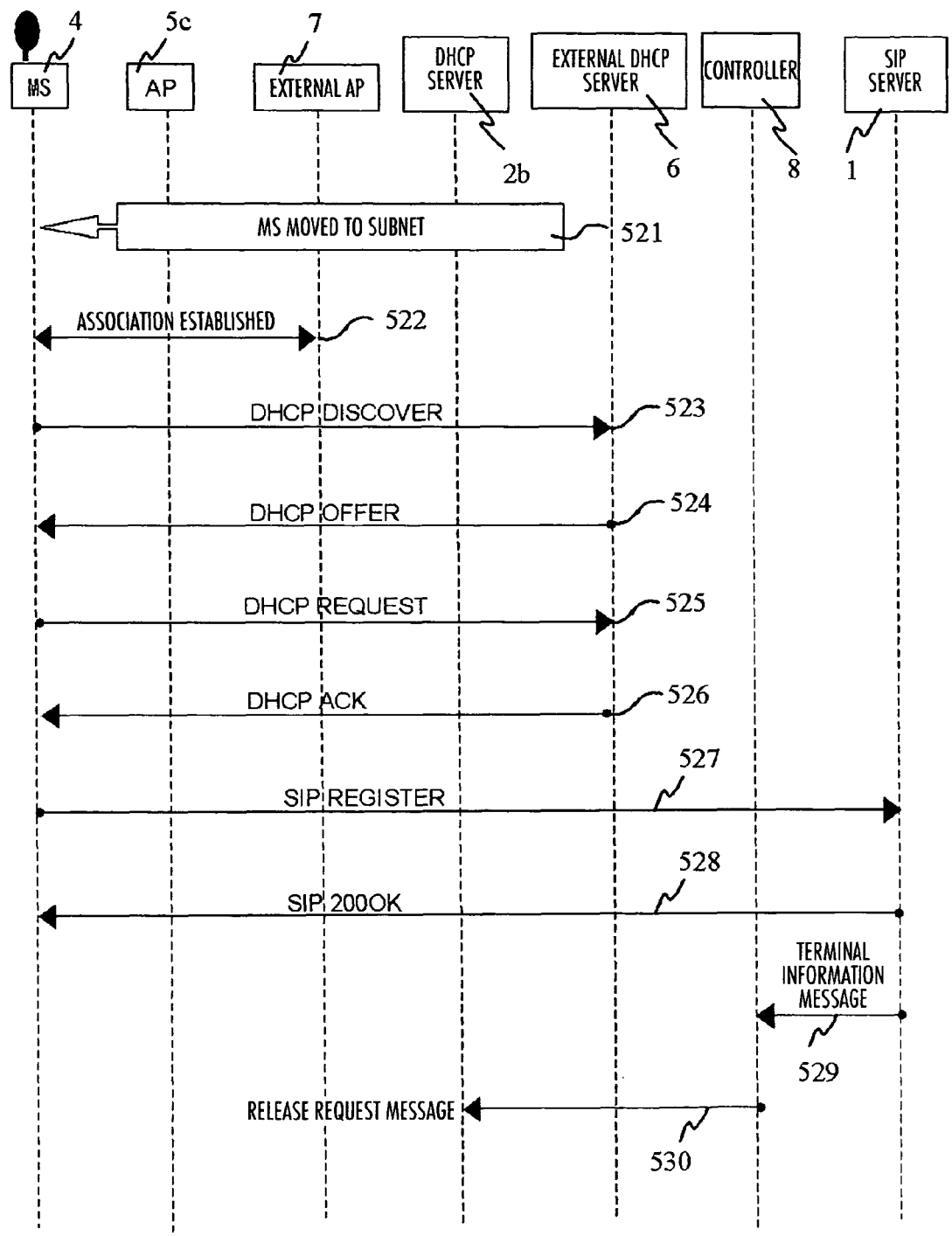
FIG. 13 is a sequence diagram when a wireless IP telephone terminal is moved to an external subnet.

Assume after this that the wireless IP telephone terminal 4 is moved into the external subnet 12 (521 in FIG. 13). Immediately after the terminal movement, the wireless IP telephone terminal 4 establishes an association with the external access point 7 (522 in FIG. 13), and transmits a DHCP DISCOVER message to the external DHCP server 6 (523 in FIG. 13). The external DHCP server 6, when receiving the message, subsequently leases an IP address to the wireless IP telephone terminal 4 by exchanging a DHCP OFFER message (524 in FIG. 13), a DHCP REQUEST message (525 in FIG. 13), and a DHCP ACK message (526 in FIG. 13) with the wireless IP telephone terminal 4, because the external DHCP server 6 is an ordinary DHCP server. The lease period at this time is decided by the policy of the system administrator providing the external subnet. Assume now that the IP address leased from the external DHCP server 6 has a value of 'ip4'.

The wireless IP telephone terminal 4 when receiving the DHCP ACK message transmits a SIP REGISTER message to the SIP server 1 (527 in FIG. 13). The SIP server 1 in turn, when receiving the message, transmits a SIP 200 OK message to the wireless IP telephone terminal 4 (528 in FIG. 13). At this time, the SIP server 1 also transmits a terminal information message to the controller 8 (529 in FIG. 13). A value 'userA@abc.com' is stored in the SIP URI field 203 (FIG. 9A) of this message, a value 'ip4' is stored in the contact IP address 204 (FIG. 9A), and a P flag is stored in the flag field 205 (FIG. 9A).

The controller 8, when receiving the terminal information message, transmits a release request message to the DHCP server 2b (that is, with a destination IP address of 'dhcp2') (530 in FIG. 13). A value 'mad1' is stored in the MAC address field 234 (FIG. 9D) of the same message, and a value 'ip3' is stored in the IP address field 235 (FIG. 9D). For the entries (631 in FIG. 11D), the controller further sets a value 'ip4' in the IP address 62 (FIG. 4C) and clears the value of the DHCP server field 64 (FIG. 4C). At this time point, entries for the wireless IP telephone terminal 4 in the terminal information table 60 of the controller 8 are as shown by 632 in FIG. 11D. The DHCP server 2b, when receiving the release request message from the controller 8, releases the IP address 'ip3'. Thus the IP address can be again used.

As has been mentioned above, even when the wireless IP telephone terminal 4 is moved to an external subnet to which the present invention is not applied; the IP address, which became unnecessary in the wireless IP telephone system of the present invention, can be released, thus realizing the same effect as the embodiment 1.

Embodiment 5

In order to inform of the state of the IP telephone terminal in the foregoing embodiment, the SIP server have played a role of transmitting the terminal information message to the controller. However, a presence server may play this role. This will be explained in the present embodiment.

Assume for example that the presence server can detect a change in the correspondence relation between the SIP URI and IP address of the IP telephone terminal in order to keep track of the positional information of the IP telephone terminal or the like. This relation is updated by the SIP server which informs the presence server of the fact when receiving the SIP REGISTER message from the IP telephone terminal. Or when the IP telephone terminal has a presentity (a client for providing presence information) function, the IP telephone terminal can also update the relation by transmitting a PUBLISH message to the presence server. When confirming the updating of the current IP address of each IP telephone terminal by any of the aforementioned methods, the presence server transmits such a terminal information message as shown in FIG. 9A to the controller. The controller, when receiving the terminal information message, performs such operation as shown by the flow chart of FIG. 8 in exactly the same manner as in the foregoing embodiment to update the terminal information table of the controller or to transmit a release request to the DHCP server. As mentioned above, the effect of the present invention can be realized even by the presence server which transmits the terminal information message to the controller.

It is also possible that the presence server cooperating with such an application program as a scheduler provides a lease period for an IP address to be leased to the IP telephone terminal of the user. Assuming for example that such a reservation that a user A uses a conference room for 2 hours is already recorded in the scheduler, then the scheduler transmits a terminal information message relating to a terminal of the user A to the controller, the message including an option to specify the lease period of the terminal at 2 hours. When receiving the message, the controller transmits a lease period response message having the lease period set at 2 hours to the DHCP server when transmitting a lease period inquiry message to the controller. As a result, efficient IP address lease according to the schedule of each user can be realized.

Embodiment 6

Explanation will next be made as to modification points required in the embodiment 1 when the present invention is applied in such an environment that a plurality of different wireless IP telephone terminals can have an identical SIP URI as an embodiment 6.

In the present embodiment, a controller 8 has such a terminal information table 60 as shown in FIG. 4D. That is, the terminal information table 60 of FIG. 4D includes, in addition to the entries shown by FIG. 4C, an added new IP address field 67 (FIG. 4D). In the step 382 (FIG. 8), the controller 8 further searches the terminal information table 60 under conditions of "new IP address field 67 (FIG. 4D)=contact IP address 204 (FIG. 9A)" in addition to the SIP URI.

Meanwhile, in the step 354 (FIG. 7), the DHCP server not only updates the new DHCP server field 65 (FIG. 4D) but also updates the new IP address field 67 (FIG. 4D). More specifically, the value of the IP address field 215 (FIG. 9B) of the lease period inquiry message is copied to the new IP address field 67 (FIG. 4D).

With such modification as mentioned above, even the presence of a plurality of wireless IP telephone terminals having the same SIP URI enables unique identification of the corresponding wireless IP telephone terminal by referring to the new IP address field 67 (FIG. 4D). Accordingly, as in the embodiment 1, the setting of a suitable lease period for an IP address can be made, and the release of an IP address, which became unnecessary, can be released.

Embodiment 7

Figure 14:
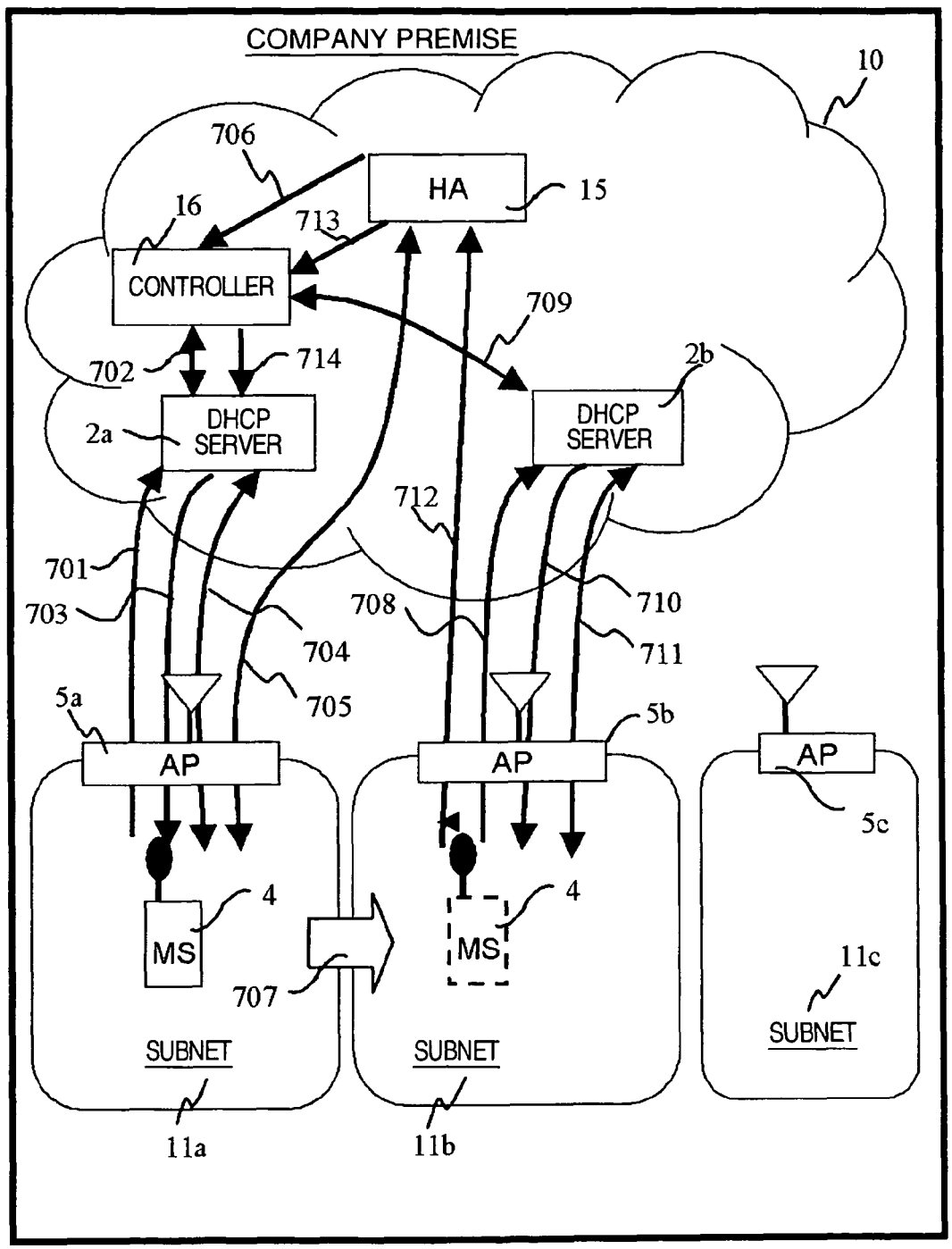
FIG. 14 is a network configuration of a wireless IP telephone system using a mobile IP.

Explanation will be made as to the operation of the invention when a wireless IP telephone terminal realizes a handoff between subnets using the MN (Mobile Node) function of the mobile IP as an embodiment 7. FIG. 14 shows a network configuration of the present embodiment and a packet sequence diagram when the wireless IP telephone terminal is moved between subnets. With regard to the network configuration of FIG. 14, only a difference between the network configuration of FIG. 14 and the network configuration of FIG. 2 will be explained.

Figures 15A, 15B, 15C:
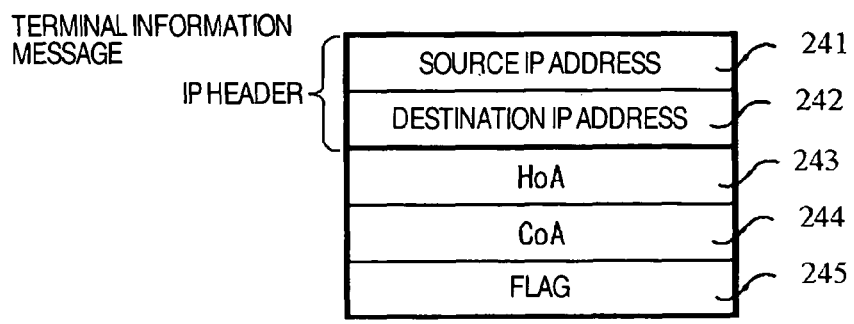
FIGS. 15A and 15B show different terminal information tables in the system using the mobile IP respectively.
FIG. 15C shows a terminal information message.

A home agent (HA) 15 is provided in the base network 10. The HA 15 manages a correspondence between a home address (HoA) as an IP address permanently allocated to each wireless IP telephone terminal and a 'Care Of Address' (CoA) as an IP address temporarily leased to the wireless IP telephone terminal in a visited subnet. The operation of a controller 16 is nearly the same as the operation of the controller 8 in FIG. 2. However, the terminal information table 60 possessed by the controller 16 is as shown in FIG. 15A. A MAC address field 71 (FIG. 15A), an IP address field 72 (FIG. 15A), a DHCP server field 74 (FIG. 15A), a new DHCP server field 75 (FIG. 15A), and a flag field 76 (FIG. 15A) are exactly the same as those in FIG. 4C. However, a HoA field 73 (FIG. 15A) is present in place of the SIP URI field 63 (FIG. 4C). FIG. 15C shows a terminal information message transmitted by the HA 15 to the controller 16. This message 241 includes a source IP address field 241 (FIG. 15C), a destination IP address field 242 (FIG. 15C), an HoA field 243 (FIG. 15C), a CoA field 244 (FIG. 15C), and flag field 245 (FIG. 15C). The operation of the controller 16 when receiving the terminal information message is the same as the operation of FIG. 8, but a representation 'SIP URI' in the steps 382 and 394 of FIG. 8 is replaced with a representation 'HoA'. The wireless IP telephone terminal 4 has the MN function. Other arrangement is exactly the same as shown in FIG. 2.

Having the above explanation in mind, explanation will next be made as to an example of operation of the wireless IP telephone system of FIG. 14 when the wireless IP telephone terminal is activated in the subnet 11a and moved to the subnet 11b. However, it is assumed in the present embodiment that entries for the wireless IP telephone terminal 4 are previously recorded in the terminal information table 60 of the controller 16 by the system administrator. The entries are as shown by reference numeral 731 in FIG. 15B. That is, the MAC address has a value of 'mac1' and the HoA has a value of 'hoa1'. Since the terminal is a mobile terminal having the MN function, a P flag is set but an F flag is not set.

Assume that the user first turns ON the power of the wireless IP telephone terminal 4 in the subnet 11a. Immediately after the turning ON, the wireless IP telephone terminal 4 establishes an association with the access point 5a and transmits a DHCP DISCOVER message to the DHCP server 2a (701 in FIG. 14). The DHCP server 2a, when receiving the message, transmits a lease period inquiry message with an address 'ip6' to be leased to the controller 16. When receiving the message, the controller 16 stores the address 'dhcp1' of the DHCP server 2a in the new DHCP server field 75 (FIG. 15A) for the entry (731 in FIG. 15B). Further, the controller confirms the flag field 76 (FIG. 15A). Since a P flag is set, the controller selects a long lease period and transmits a lease period response message to the DHCP server 2a (702 in FIG. 14).

When receiving this lease period response message, the DHCP server 2a transmits a DHCP OFFER message to the wireless IP telephone terminal 4 (703 in FIG. 14), and informs the terminal of an IP address to be leased and its lease period. The lease period is the long lease period specified by the controller 16. When receiving the data, the wireless IP telephone terminal 4 transmits a DHCP REQUEST message to the DHCP server 2a in order to require the server to lease the address, and the DHCP server 2a responds to it and transmits a DHCP ACK message to the wireless IP telephone terminal 4 (704 in FIG. 14). When receiving the message, the wireless IP telephone terminal 4 transmits a registration request message to the HA 15 to thereby record a correspondence between 'hoa1' as its own HoA and 'ip6' as the current CoA (705 in FIG. 14). At this time, the HA 15 further transmits a terminal information message to the controller 16 (706 in FIG. 14). The value 'hoa1' is stored in the HoA field 243 (FIG. 15C) of this message, and the value 'ip6' is stored in the CoA field 244 (FIG. 15C) respectively.

When receiving the message, the controller 16 sets 'ip6' in the IP address field 72 (FIG. 15A) with respect to the corresponding entry of the terminal information table 60, stores 'dhcp1' in the DHCP server field 74 (FIG. 15A), and clears the value of the new DHCP server field 75 (FIG. 15A). At this time point, entries for the wireless IP telephone terminal 4 in the terminal information table 60 of the controller 16 are as shown by 732 in FIG. 15B.

After this, it is assumed that the user moves into the subnet 11b, that is, the wireless IP telephone terminal 4 is moved into the subnet 11b (707 in FIG. 14). Immediately after the movement, the wireless IP telephone terminal 4 establishes an association with the access point 5b and transmits a DHCP DISCOVER message to the DHCP server 2b (708 in FIG. 14). When receiving the message, the DHCP server 2b transmits to the controller 16 a lease period inquiry message with an address 'ip7' to be leased. When receiving the message, the controller 16 performs exactly the same operation as the above case, selects a long lease period, and transmits a lease period response message to the DHCP server 2b (709 in FIG. 14). The long lease period selected in the previous step is stored in the lease period field 226 (FIG. 9C) of the same message. At this time point, entries for the wireless IP telephone terminal 4 in the terminal information table 60 of the controller 16 are as shown by reference numeral 733 in FIG. 15B.

When receiving the lease period response message, the DHCP server 2b transmits a DHCP OFFER message to the wireless IP telephone terminal 4 (710 in FIG. 14) to inform the terminal of the IP address to be leased and its lease period. This lease period is the long lease period specified by the controller 16. When receiving the data, the wireless IP telephone terminal 4 transmits a DHCP REQUEST message to the DHCP server 2b. The DHCP server 2b when responding to the message transmits a DHCP ACK message to the wireless IP telephone terminal 4 (711 in FIG. 14). When receiving the message, the terminal 4 transmits a registration request message to the HA 15 (712 in FIG. 14) to register or record a correspondence between 'hoa1' and 'ip7'. At this time, the HA 15 also transmits a terminal information message to the controller 16 (713 in FIG. 14). The value 'hoa1' is stored in the HoA field 243 (FIG. 15C) of this message, and the value 'ip7' is stored in the CoA field 244 (FIG. 15C) respectively.

When receiving the data, the controller 16 transmits a release request message to the DHCP server 2a (714 in FIG. 14). The value 'mac1' is stored in the MAC address field 234 (FIG. 9D) of the same message, and the value 'ip6' is stored in the IP address field 235 (FIG. 9D). The controller further updates entries (733 in FIG. 15B) in the terminal information table 60 in a manner similar to the above case. As a result, entries for the wireless IP telephone terminal 4 in the terminal information table 60 of the controller 16 are as shown by reference numeral 734 in FIG. 15B. The DHCP server 2a when receiving the release request message from the controller 16 releases the IP address 'ip6' to put it in its reusable state.

As has been explained in the foregoing, even the wireless IP telephone system using the mobile IP can have substantially the same effect as the foregoing embodiment 1.

As mentioned above, the present invention can be applied not only as a wireless IP telephone system but also as a system of effectively using an IP address in a network system having a mobile terminal therein.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wireless Internet Protocol (IP) telephone system connected to a network having a plurality of subnets, comprising:
   a call control server;
   at least one fixed terminal;
   a plurality of mobile terminals;
   an address lease server for leasing an address to said mobile terminals and the at least one fixed terminal; and
   a controller for holding at least one of type information about the mobile terminal, information indicative of presence or absence of a movement notification function, the leased address, and identification information about said address lease server,
   wherein said call control server, said mobile terminals, said at least one fixed terminal, said address lease server and said controller are connected to each other,
   wherein, when an address is leased to each of said mobile terminals and said at least one fixed terminal, said controller sets an effective period of the address suitable for each of said mobile terminals and said at least one fixed terminal on the basis of information about a presence or absence of a subnet-wise movement notification function of said mobile terminals and said at least one fixed terminal by referring to a flag,
   wherein the flag indicates presence when there is an indication that a specific terminal has a capability of informing the current address, and
   wherein the flag indicates absence when there is an indication that a specific terminal is a fixed terminal.

2. A wireless IP telephone system according to claim 1, wherein the information held by said controller is manually set by a system administrator.

3. A wireless IP telephone system according to claim 2, wherein, when an address leased to said mobile terminal becomes unnecessary, said controller detects the fact of the unnecessary address.

4. A wireless IP telephone system according to claim 3, wherein said controller, upon detecting the fact of the unnecessary address leased to said mobile terminal, requires said address lease server to release said address.

5. A wireless IP telephone system according to claim 1, wherein the information held by said controller is dynamically set by said call control server, said address lease server, and said controller.

6. A wireless IP telephone system according to claim 1, wherein said controller determines the effective period to be set to said mobile terminal on the basis of information about said mobile terminal.

7. A wireless IP telephone system according to claim 1, wherein, when said controller, upon detecting that an address different from said leased address is leased to each of said mobile terminals, requires said address lease server to release said leased address.

* * * * *